US008881604B2

United States Patent
Zhu et al.

(10) Patent No.: US 8,881,604 B2
(45) Date of Patent: Nov. 11, 2014

(54) MEASURING SYSTEM HAVING A VIBRATION-TYPE MEASURING TRANSDUCER

(75) Inventors: Hao Zhu, Freising (DE); Wolfgang Drahm, Erding (DE); Alfred Rieder, Landshut (DE); Vivek Kumar, Muttenz (CH)

(73) Assignee: Endress + Hauser Flowtec AG, Reinach (CH)

( * ) Notice: Subject to any disclaimer, the term of this patent is extended or adjusted under 35 U.S.C. 154(b) by 478 days.

(21) Appl. No.: 13/213,215

(22) Filed: Aug. 19, 2011

(65) Prior Publication Data

US 2012/0042732 A1   Feb. 23, 2012

Related U.S. Application Data

(60) Provisional application No. 61/344,552, filed on Aug. 19, 2010.

(30) Foreign Application Priority Data

Aug. 19, 2010   (DE) .......................... 10 2010 039 543

(51) Int. Cl.
*G01F 1/84* (2006.01)
*G01F 1/74* (2006.01)

(52) U.S. Cl.
CPC ............ *G01F 1/8436* (2013.01); *G01F 1/8472* (2013.01); *G01F 1/8477* (2013.01); *G01F 1/74* (2013.01)
USPC .................................................. 73/861.354

(58) Field of Classification Search
CPC ... G01F 1/8436; G01F 1/8486; G01F 1/8431; G01F 1/8477; G01F 1/8413; G01F 1/8472
See application file for complete search history.

(56) References Cited

U.S. PATENT DOCUMENTS

2006/0000293 A1*  1/2006  Rieder et al. ............. 73/861.357
2007/0086686 A1   4/2007  Ishikawa
(Continued)

FOREIGN PATENT DOCUMENTS

DE   10 2007 061 690 A1   6/2008
EP   0 462 711 A1         12/1991
(Continued)

OTHER PUBLICATIONS

International Search Report in corresponding PCT Application No. PCT/EP2011/061723.
(Continued)

*Primary Examiner* — Harshad R Patel
(74) *Attorney, Agent, or Firm* — Bacon & Thomas, PLLC

(57) ABSTRACT

A measuring system comprises: a measuring transducer of vibration type, through which fluid flows during operation, and which produces oscillation signals corresponding to parameters of the flowing fluid; as well as a transmitter electronics (TE), which is electrically coupled with the measuring transducer, and serves for activating the measuring transducer and for evaluating oscillation signals delivered by the measuring transducer. The measuring transducer (MT) includes: At least one measuring tube (10; 10') for conveying flowing fluid; at least one electro-mechanical oscillation exciter (41) for actively exciting and/or maintaining bending oscillations of the at least one measuring tube in a wanted mode; and at least a first oscillation sensor (51) for registering vibrations of the at least one measuring tube, and for producing an oscillation signal ($s_1$) of the measuring transducer, representing vibrations at least of the at least one measuring tube. The transmitter-electronics (TE), in turn, generates, by means of a signal component of the oscillation signal, which represents a bending oscillation mode, in which the at least one vibrating measuring tube executes bending oscillations with at least one oscillatory antinode more than in the case of the bending oscillations in the wanted mode, a cavitation report ($X_{KV}$), which signals an occurrence of cavitation in the fluid.

24 Claims, 13 Drawing Sheets

(56) References Cited

U.S. PATENT DOCUMENTS

| | | | |
|---|---|---|---|
| 2009/0173169 A1* | 7/2009 | Bitto et al. | 73/861.355 |
| 2011/0154912 A1* | 6/2011 | Kumar et al. | 73/861.19 |
| 2011/0161017 A1* | 6/2011 | Kumar et al. | 702/47 |
| 2011/0161018 A1* | 6/2011 | Kumar et al. | 702/48 |

FOREIGN PATENT DOCUMENTS

| | | |
|---|---|---|
| WO | WO 2009/089839 A1 | 7/2009 |
| WO | WO 2010/091700 | 8/2010 |

OTHER PUBLICATIONS

Johannes Goeke et al., "Neue Parameter zur Analyse der Storungen eines Coriolis-Massemessers", Technisches Messen, vol. 74, No. 11, 2007, pp. 577-588.

International Preliminary Report on Patentability in PCT/EP2011/061723, issued Feb. 19, 2013, English translation thereof.

* cited by examiner

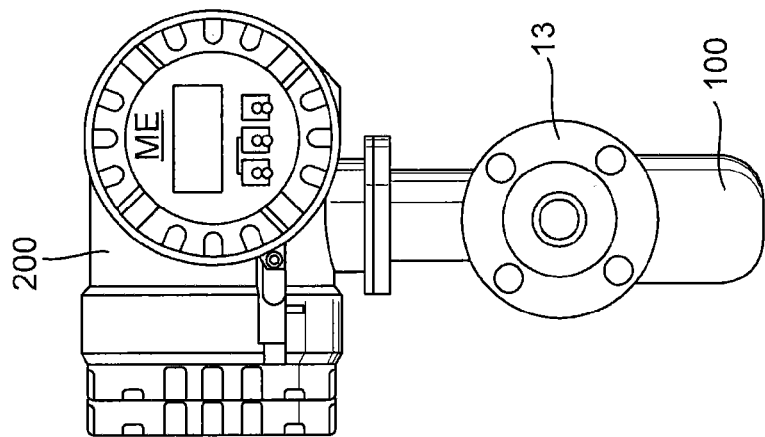
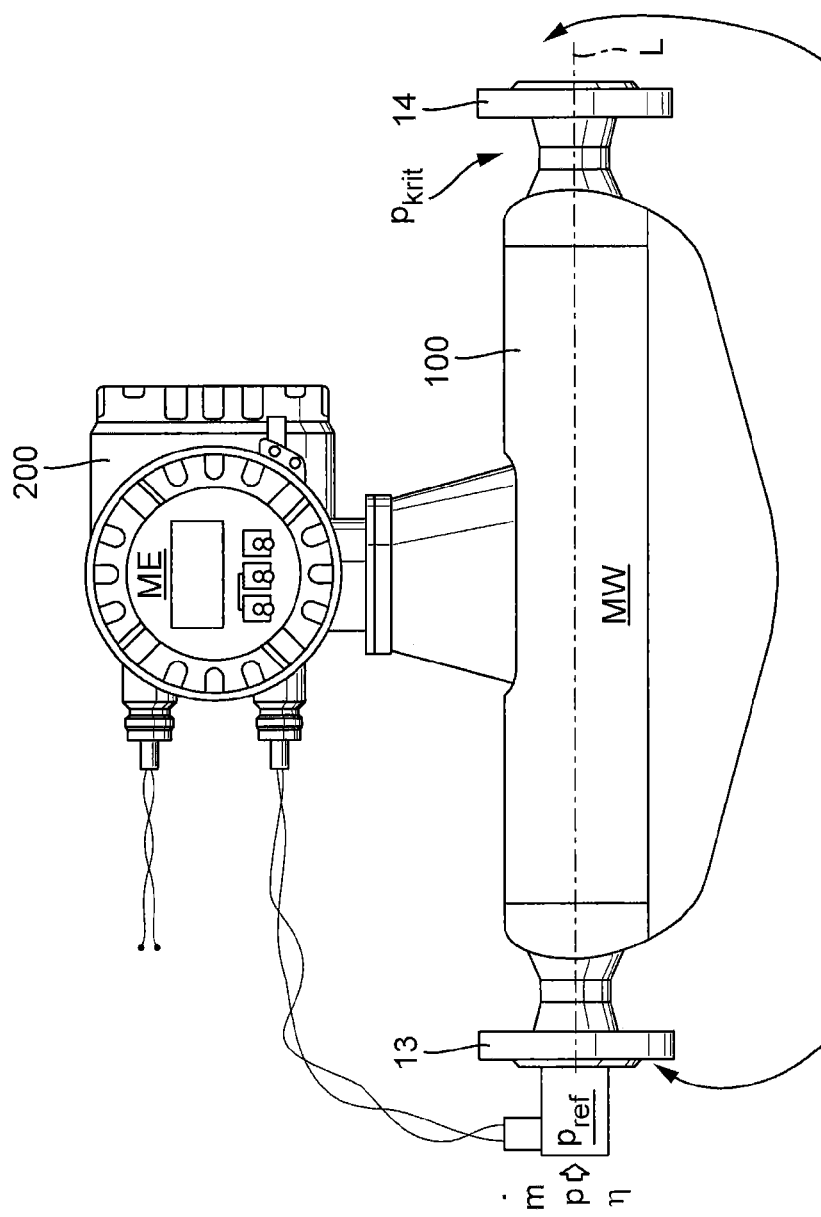

MEASURING SYSTEM HAVING A VIBRATION-TYPE MEASURING TRANSDUCER

CROSS-REFERENCE TO RELATED APPLICATION:

This application is a Nonprovisional which claims the benefit of U.S. Provisional Application Ser. No 61/344,552, which was filed on Aug. 19, 2010.

TECHNICAL FIELD

The invention relates to a measuring system for fluids, especially a measuring system embodied as a compact measuring device and/or as a Coriolis mass flow measuring device, wherein the measuring system comprises: a measuring transducer of the vibration type, through which, during operation, fluid flows, at least at times, and which generates oscillation signals influenced by at least one measured variable, especially a mass flow, a density, a viscosity, etc., characterizing the flowing fluid; as well as transmitter electronics, which is electrically coupled with the measuring transducer, and which processes into measured values oscillation signals delivered by the measuring transducer.

BACKGROUND DISCUSSION

In industrial measurements technology, especially also in connection with the control and monitoring of automated manufacturing processes, for ascertaining characteristic measured variables of fluids, for example, liquids and/or gases, flowing in a process line, for example, a pipeline, often such measuring systems are used, which, by means of a measuring transducer of the vibration type and transmitter electronics connected thereto and most often accommodated in a separate, electronics housing, induce reaction forces—for example, Coriolis forces—in the flowing fluid, and produce, recurringlly derived from these, measurement values correspondingly representing the at least one measured variable, for example, a mass flow rate, a density, a viscosity or some other process parameter. Such measuring systems—often formed by means of an in-line measuring device in compact construction with integrated measuring transducer, such as, for instance, a Coriolis mass flow meter—are long since known and have proven themselves in industrial use. Examples of such measuring systems having a measuring transducer of the vibration type, or also individual components thereof, are described e.g. in EP-A 317 340, JP-A 8-136311, JP-A 9-015015, US-A 2007/0119264, US-A 2007/0119265, US-A 2007/0151370, US-A 2007/0151371, US-A 2007/0186685, US-A 2008/0034893, US-A 2008/0141789, U.S. Pat. Nos. 4,680,974, 4,738,144, 4,777,833, 4,801,897, 4,823,614, 4,879,911, 5,009,109, 5,024,104, 5,050,439, 5,291,792, 5,359,881, 5,398,554, 5,476,013, 5,531,126, 5,602,345, 5,691,485, 5,734,112, 5,796,010, 5,796,011, 5,796,012, 5,804,741, 5,861,561, 5,869,770, 5,945,609, 5,979,246, 6,047,457, 6,092,429, 6,073,495, 6,311,136, 6,223,605, 6,330,832, 6,397,685, 6,513,393, 6,557,422, 6,651,513, 6,666,098, 6,691,583, 6,840,109, 6,868,740, 6,883,387, 7,017,424, 7,040,179, 7,073,396, 7,077,014, 7,080,564, 7,134,348, 7,216,550, 7,299,699, 7,305,892, 7,360,451, 7,392,709, 7,406,878, WO-A 00/14 485, WO-A 01/02 816, WO-A 2004/072588, WO-A 2008/013545, WO-A 2008/07 7574, WO-A 95/29386, WO-A 95/16897 or WO-A 99 40 394. Each of the therein illustrated measuring transducers comprises at least one essentially straight or curved measuring tube, which is accommodated in a measuring transducer housing and conveys or guides the— in given cases, also extremely rapidly, or extremely slowly— flowing fluid. In operation of the measuring system, the at least one measuring tube is caused to vibrate for the purpose of generating oscillation forms influenced by the fluid flowing through the measuring tube.

In the case of measuring transducers having two measuring tubes, these are most often integrated into the process line via a flow divider extending on the inlet-side between the measuring tubes and an inlet-side connecting flange, as well a via a flow divider extending on the outlet-side between the measuring tubes and an outlet-side connecting flange. In the case of measuring transducers having a single measuring tube, the latter communicates with the process line most often via an essentially straight connecting tube piece opening on the inlet-side, as well as via an essentially straight connecting tube piece opening on the outlet-side. Additionally, each of the illustrated measuring transducers having a single measuring tube comprises, in each case, at least one one-piece or multipart—for example, tube-, box- or plate-shaped—counteroscillator, which is coupled to the measuring tube on the inlet-side for forming a first coupling zone, and which is coupled to the measuring tube on the outlet-side for forming a second coupling zone, and which, during operation, essentially rests or oscillates opposite-equally to the measuring tube, thus with equal frequency and opposite phase. The inner part of the measuring transducer formed by means of the measuring tube and counteroscillator is most often held, especially in a manner enabling oscillations of the inner part relative to the measuring tube, in a protective measuring transducer housing alone by means of the two connecting tube pieces, via which the measuring tube communicates during operation with the process line. In the case of the measuring transducers—for example, as illustrated in U.S. Pat. Nos. 5,291,792, 5,796,010, 5,945,609, 7,077,014, US-A 2007/0119264, WO-A 01 02 816 or also WO-A 99 40 394— having a single, essentially straight, measuring tube, the latter and the counteroscillator are, as is quite usual in the case of conventional measuring transducers, oriented essentially coaxially relative to one another. In the case of usually marketed measuring transducers of the aforementioned type, the counteroscillator is also most often essentially tubular, and is embodied as an essentially straight, hollow cylinder, which is arranged in the measuring transducer in such a manner that the measuring tube is at least partially jacketed by the counteroscillator. Most often used as materials for such counteroscillators, especially also in the case of application of titanium, tantalum or zirconium for the measuring tube, are comparatively cost-effective steel types, such as, for instance, structural steel or free-machining steel.

Selected as the excited oscillation form—the so-called wanted mode—in the case of measuring transducers having curved, e.g. U, V- or Ω-like shaped, measuring tubes is usually that eigenoscillation form is selected, in the case of which the measuring tube moves in a pendulum-like manner at least partially in a lowest natural resonance frequency about an imaginary longitudinal axis of the measuring transducer, like a cantilever clamped on one end, whereby Coriolis forces are induced in the fluid flowing through dependent on the mass flow. These forces, in turn, lead to the fact that, superimposed on the excited oscillations of the wanted mode, in the case of curved measuring tubes and thus pendulum-like, cantilever oscillations, are bending oscillations of a frequency equal to the former according to at least one, likewise natural, second oscillation form, the so-called Coriolis mode. In the case of measuring transducers with a curved measuring tube, these cantilever oscillations in the Coriolis mode caused by Coriolis forces usually correspond to that eigenoscillation form, in the case of which the measuring tube also executes rotary oscillations about an imaginary vertical axis directed perpendicular to the longitudinal axis. In the case of measuring transducers with a straight measuring tube, in contrast, for the purpose of producing of mass flow dependent Coriolis forces, often such a wanted mode is selected, in the case of which the measuring tube executes at least partially bending oscillations essentially in a single imaginary plane of oscillation, such that the oscillations in the Coriolis mode are bending oscillations of equal oscillation frequency with the wanted mode oscillations and coplanar thereto. Due to the superpositioning of wanted- and Coriolis modes, the oscillations of the vibrating measuring tube registered by means of the sensor arrangement on the inlet-side and on the outlet-side have a measurable phase difference also dependent on the mass flow. Usually, the measuring tubes of such measuring transducers, applied e.g. in Coriolis mass flow meters, are excited during operation to an instantaneous natural resonance frequency of the oscillation form selected for the wanted mode, especially with an oscillation amplitude controlled to be constant. Since this resonance frequency is dependent, especially, also on the instantaneous density of the fluid, and the density of flowing fluids can, in addition to the mass flow, also be measured by means of market-usual Coriolis mass flow meters. Additionally, it is also possible, as, for example, is shown in U.S. Pat. Nos. 6,651,513 or 7,080,564, directly to measure the viscosity of the fluid flowing through by means of measuring transducers of the vibration type, for example, based on an exciter energy or excitation power required for maintaining the oscillations, and/or based on a damping of oscillations (especially those in the aforementioned wanted mode) of the at least one measuring tube resulting from a dissipation of oscillatory energy. Moreover, also other measured variables derived from the aforementioned primary measured values of mass flow rate, density and viscosity can be ascertained, such as, for instance, the Reynolds number; compare U.S. Pat. No. 6,513,393.

For exciting oscillations of the at least one measuring tube, measuring transducers of the vibration type have, additionally, an exciter mechanism driven during operation by an electrical exciter signal, e.g. a controlled electrical current, generated and correspondingly conditioned by the mentioned driver electronics. The exciter mechansim excites the measuring tube to bending oscillations in the wanted mode by means of at least one electro-mechanical, especially electrodynamic, oscillation exciter acting practically directly on the measuring tube, and flowed through during operation by an electrical current. Furthermore, such measuring transducers comprise a sensor arrangement having oscillation sensors, especially electro-dynamic oscillation sensors, for the at least pointwise registering of inlet-side and outlet-side oscillations of the at least one measuring tube, especially those in the Coriolis mode, and for producing electrical sensor signals influenced by the process parameter to be registered, such as, for instance, the mass flow or the density, and serving as oscillation signals of the measuring transducer. As, for example, is described in U.S. Pat. No. 7,216,550, in the case of measuring transducers of the type being discussed, in given cases, also the oscillation exciter can at least at times be used as an oscillation sensor and/or an oscillation sensor can at least at times can be used as an oscillation exciter. The exciter mechanism of measuring transducers of the type being discussed usually includes at least one electrodynamic oscillation exciter and/or an oscillation exciter acting differentially on the at least one measuring tube and the in given cases present counteroscillator or the in given cases present other measuring tube, while the sensor arrangement comprises an inlet-side, most often likewise electrodynamic oscillation sensor, as well as at least one outlet-side oscillation sensor constructed essentially equally thereto. Such electrodynamic and/or differential oscillation exciters of usually marketed measuring transducers of the vibration type are formed by means of a magnet coil, through which an electrical current at least at times flows. In the case of measuring transducers having a measuring tube and a counteroscillator coupled thereto, the magnet coil is most often affixed to the latter. Such oscillation exciters further include a rather elongated, especially rod-shaped permanent magnet interacting with the at least one magnet coil, especially plunging into it, and serving as an armature and affixed correspondingly to the measuring tube to be moved. The permanent magnet and the magnet coil serving as an exciter coil are, in such case, usually oriented in such a manner that they extend essentially coaxially relative to one another. Additionally, in the case of conventional measuring transducers, the exciter mechanism is usually embodied in such a manner and placed in the measuring transducer in such a manner that it acts essentially centrally on the at least one measuring tube. In such case, the oscillation exciter (and, in this respect, the exciter mechanism) is—such as, for example, is also shown in the case of the measuring transducers proposed in U.S. Pat. Nos. 5,796,010, 6,840,109, 7,077,014 or 7,017,424—most often affixed from the outside at least pointwise along an imaginary central, peripheral line of the measuring tube. As an alternative to an exciter mechanism formed by means of oscillation exciters acting centrally and directly on the measuring tube—such as, among other things, is proposed in U.S. Pat. Nos. 6,557,422, 6,092,429 or 4,823,614—exciter mechanisms formed, for example, by means of two oscillation exciters affixed not in the center of the measuring tube, but instead rather at the inlet and outlet-sides thereof, respectively, can also be used, or—as is, among other things, proposed in U.S. Pat. Nos. 6,223,605 or 5,531,126—exciter mechanisms formed, for example, by means of an oscillation exciter acting between the in given cases present counteroscillator and the measuring transducer housing can also be used. In the case of most market-usual measuring transducers of the vibration type, the oscillation sensors of the sensor arrangement are, as already indicated, at least insofar as they work according to the same principle of action, embodied with essentially equal construction to the at least one oscillation exciter. Accordingly, also the oscillation sensors of such a sensor arrangement are most often in each case formed by means of 1) at least one magnet coil—usually affixed to the in given cases present counteroscillator—at least at times passed through by a variable magnetic field and, associated therewith, at least at times supplied with an induced measurement voltage, as well as by means of 2) a permanently magnetic armature, which delivers the magnetic field. The armature is affixed to the measuring tube, and interacts with the at least one coil. Each of the aforementioned coils is additionally connected by means of at least one pair of electrical connecting lines with the mentioned transmitter electronics of the in-line measuring device. The connecting lines are led most often on as short as possible paths from the coils via the counteroscillator to the measuring transducer housing.

As, among other things, is discussed in the previously mentioned U.S. Pat. Nos. 7,406,878, 7,305,892, 7,134,348, 6,513,393, 5,861,561, 5,359,881 or WO-A 2004/072588, a further parameter relevant for operation of the measuring system as such and/or for operation of the plant in which the measuring system is installed can be a pressure loss in the flow (for example, a pressure loss caused by the measuring transducer and, in this respect, by the measuring system) or a lowered pressure resulting therefrom in the outlet-side of the measuring transducer. Pressure loss in the flow is important, especially also for the case, in which the fluid has two or more phases, for instance, a liquid gas mixture, and/or in which, during operation, undesired cavitation (which can even endanger the structural integrity of the measuring transducer) as a result of subceeding, or falling beneath, a minimum static pressure in the flowing fluid must be prepared for, or unconditionally prevented.

SUMMARY OF THE INVENTION

An object of the invention is, consequently, to improve measuring systems formed by means of measuring transducers of the vibration-type toward the goal that, therewith, the occurrence of cavitation in the fluid flowing through the measuring transducer can be detected reliably and as early as possible, not least of all also for the purpose of signaling or compensating for an increased accuracy of measurement, and/or for the purpose of issuing alarms for an undesirably high pressure drop in the fluid flowing through the measuring transducer, as provoked by the measuring transducer, and/or for the purpose of detecting increased wear of the measuring transducer as a result of cavitation erosion, this especially also in the case of primary—in given cases, also exclusive—application of measurements technology proven in such measuring systems, such as, for instance, established oscillation sensors and/or actuation technology, or also proven technologies and architectures of established transmitter electronics.

For achieving the object, the invention resides in a measuring system, especially a compact measuring device and/or Coriolis mass flow measuring device, especially for fluids flowing in pipelines. This measuring system comprises: 1) a measuring transducer of the vibration type, through which, during operation, a fluid flows, for instance a liquid or other flowable material tending toward cavitation, and which produces oscillation signals corresponding to parameters, especially a mass flow rate, a density and/or a viscosity, of the flowing fluid, as well as; 2) transmitter electronics, electrically coupled with the measuring transducer, for activating the measuring transducer, and for evaluating oscillation signals delivered by the measuring transducer. The measuring transducer includes: at least one measuring tube, for example, a V-shaped, U-shaped, Z-shaped or straight measuring tube for conveying flowing fluid; at least one electro-mechanical—for example, electrodynamic—oscillation exciter for actively exciting and/or maintaining vibrations of the at least one measuring tube in a wanted mode, for example, in such a manner that the at least one measuring tube at least partially executes over a wanted oscillation length bending oscillations with a single oscillatory antinode and/or bending oscillations at an instantaneous minimum bending oscillation resonance frequency inherent for said measuring tube and/or bending oscillations in a natural bending oscillation mode inherent for said measuring tube; as well as a first oscillation sensor, especially an electrodynamic, first oscillation sensor, for registering vibrations, especially inlet-side vibrations, at least of the at least one measuring tube, and for producing a first oscillation signal of the measuring transducer representing vibrations, especially inlet-side vibrations, at least of the at least one measuring tube, especially a signal representing its bending oscillations. By means of a first signal component of the oscillation signal produced by means of the at least one oscillation sensor and representing a bending oscillation mode, in which the at least one vibrating measuring tube executes bending oscillations having at least one oscillatory antinode more than in the case of the bending oscillations in the wanted mode, for example, namely bending oscillations with at least two oscillation antinodes, the transmitter-electronics generates, for instance, a cavitation report—also declared an alarm—which signals, for example, in a visual and/or acoustically perceivable manner, an occurrence of cavitation in the fluid.

According to a first embodiment of the invention, it additionally provided that the transmitter electronics delivers at least one exciter signal for the at least one oscillation exciter effecting bending oscillations of the at least one measuring tube. Developing this embodiment of the invention further, it is additionally provided that the exciter signal—or at least a wanted signal component of the exciter signal which dominates as regards a signal power and/or a signal voltage and which produces bending oscillations of the measuring tube—has a signal frequency which corresponds to an instantaneous resonance frequency of bending oscillations of the measuring tube, especially an instantaneous resonance frequency of a bending oscillation mode of first order, in which the at least one vibrating measuring tube executes over a wanted oscillation length bending oscillations with exactly one oscillatory antinode, so that the at least one measuring tube, excited by the at least one oscillation exciter so as to vibrate in the wanted mode, at least partially executes bending oscillations with an instantaneous resonance frequency. For example, the signal frequency of the exciter signal or the wanted signal component of the exciter signal can correspond to an instantaneous resonance frequency of a bending oscillation mode of first order, in which the at least one vibrating measuring tube executes over a wanted oscillation length bending oscillations with exactly one oscillatory antinode, and the first signal component of the oscillation signal can have a signal frequency which is greater than the signal frequency of the exciter signal corresponding to the instantaneous resonance frequency of the bending oscillation mode of first order.

According to a second embodiment of the invention, it is additionally provided that the first signal component of the oscillation signal has a signal frequency, which corresponds to an instantaneous resonance frequency of a natural bending oscillation mode inherent to the measuring tube, in which the measuring tube executes bending oscillations with exactly one oscillatory antinode more than in the case of the bending oscillations in the wanted mode, especially a bending oscillation mode of second order, in which the at least one vibrating measuring tube executes over a wanted oscillation length bending oscillations with exactly two oscillation antinodes, and/or a Coriolis mode excited as a result of Coriolis forces induced in the fluid flowing in measuring tube vibrating in the wanted mode.

According to a third embodiment of the invention, it is additionally provided that the transmitter electronics generates the cavitation report only when a magnitude of a signal voltage of the first signal component of the oscillation signal exceeds a threshold value predetermined therefor, especially one stored in the transmitter electronics and/or one changeable during operation.

According to a fourth embodiment of the invention, it is additionally provided that the transmitter electronics generates the cavitation report also by means of a second signal component of the oscillation signal, which represents a bending oscillation mode, in which the at least one vibrating measuring tube executes bending oscillations with at least one oscillatory antinode more than in the case of the oscillation mode represented by the first signal component, especially bending oscillations with at least three oscillation antinodes. Developing this embodiment of the invention further, it is additionally provided that the second signal component of the oscillation signal has a signal frequency which corresponds to an instantaneous resonance frequency of that bending oscillation mode of third order, in which the at least one vibrating measuring tube executes bending oscillations with exactly two oscillation antinodes more than in the case of the bending oscillations in the wanted mode; and/or that the transmitter electronics generates the cavitation report only when the magnitude of a signal voltage of the second signal component of the oscillation signal does not exceed a threshold value predetermined therefor, for instance, one changeable during operation and/or dependent on an instantaneous signal voltage of the first signal component of the oscillation signal. The threshold value for the magnitude of the signal voltage of the first signal component of the oscillation signal can, in such case, be selected, for example, in such a manner that it is greater than a magnitude of the signal voltage of the second signal component of the oscillation signal. Alternatively thereto or in supplementation thereof, the threshold value for the magnitude of the signal voltage of the first signal component of the oscillation signal and the threshold value for the magnitude of the signal voltage of the second signal component of the oscillation signal can be selected in such a manner that a threshold value ratio, defined by a ratio of the threshold value for the magnitude of the signal voltage of the first signal component of the oscillation signal to the threshold value for the magnitude of the signal voltage of the second signal component of the oscillation signal, is greater than one. Additionally, the transmitter electronics can also be adapted in such a manner that it only generates the cavitation report when a signal-voltage ratio, defined by a ratio of the magnitude of the signal voltage of the first signal component of the oscillation signal to the magnitude of the signal voltage of the second signal component of the oscillation signal, exceeds a threshold value predetermined for said signal-voltage ratio, especially one changeable during operation and/or dependent on an instantaneous signal voltage the of first signal component of the oscillation signal and/or dependent on an instantaneous signal voltage of the second signal component of the oscillation signal.

According to a fifth embodiment of the invention, it is additionally provided that the transmitter electronics generates the cavitation report also making use of a pressure measured value—stored, for example, in a volatile data memory provided in the transmitter electronics—which represents a pressure which, for instance, is reigning in the flowing fluid upstream from an outlet end of the measuring transducer and/or downstream from an inlet end of the measuring transducer, and which, for example, is measured by means of a pressure sensor communicating with the transmitter electronics and/or is ascertained by means of oscillation signals of the measuring transducer and/or is static and/or is set by means of a pump.

According to a sixth embodiment of the invention, it is additionally provided that the measuring system furthermore comprises a pressure sensor, which communicates during operation with the transmitter electronics, and which serves for registering a pressure, which especially is reigning upstream from an inlet end of the measuring transducer or downstream from an outlet end of the measuring transducer in a pipeline conveying the fluid, and which is, for example, static.

According to a seventh embodiment of the invention, it is additionally provided that the transmitter electronics delivers at least one exciter signal for the at least one oscillation exciter, effecting bending oscillations of the at least one measuring tube, and that, by means of the exciter signal and by means of the oscillation signal, the transmitter electronics generates a pressure difference measured value, which represents a pressure difference occurring between two predetermined reference points in the flowing fluid, and does so, for example, in such a manner that the first of the two reference points is located in the measuring transducer on the inlet-side, and/or the second of the two reference points is located in the measuring transducer on the outlet-side. The transmitter electronics can, in such case, ascertain the pressure difference measured value making use, for example, of a Reynolds number measured value, which is, for instance, stored in a volatile data memory provided in the transmitter electronics and/or produced by means of the exciter signal and/or by means of at least one oscillation signal delivered by the measuring transducer, and which represents a Reynolds number for fluid flowing in the measuring transducer; and/or making use of a viscosity measured value, which is, for instance, internally stored in a volatile data memory provided in the transmitter electronics and/or is produced during operation by means of the exciter signal and/or by means of at least one of the oscillation signals, and which represents a viscosity of fluid flowing in the measuring transducer; and can, for example, also ascertain this pressure difference in such a manner, that, for ascertaining the pressure difference measured value, the transmitter electronics generates a pressure drop coefficient, which represents a pressure drop across the measuring transducer dependent on the instantaneous Reynolds number of the flowing fluid, with reference to an instantaneous kinetic energy of the fluid flowing in the measuring transducer. Developing his seventh embodiment of the invention further, it is additionally provided that the transmitter electronics generates the cavitation report making use of the pressure difference measured value. Alternatively or additionally, making use of the pressure difference measured value, the transmitter electronics can, for example, also generate an alarm, which signals, for instance in a visually and/or acoustically perceivable manner, an exceeding of an earlier defined maximum allowable sinking of a static pressure in the fluid flowing through the measuring transducer, and/or generate an alarm, which signals—for example, also in a visually and/or acoustically perceivable manner—a too-high pressure drop in the fluid, which is provoked by the measuring transducer.

A basic idea of the invention is, based on individual selected spectral signal components of at least one of the oscillation signals—for instance, also by evaluation of their signal amplitude(s) and/or of their relative position in the frequency spectrum—to detect the occurrence of regularly undesired or also damaging cavitation within the fluid actually to be measured by means of the respective measuring system, this in given cases also further taking into consideration some small number of measurement values established for measuring flowing fluids, such as density, viscosity, mass flow rate and/or Reynolds number, which are typically available in any event in measuring systems of the type being discussed, and which also are especially ascertained internally and/or on the basis of further operating parameters which are typically internally generated by means of the transmitter electronics of such measuring systems, such as, for instance, a phase difference between the oscillation signals representing inlet-side and outlet-side oscillations of the at least one measuring tube. The invention is in such case not least of all also based on the surprising recognition, that in given cases, even solely based on oscillation signals of the aforementioned type, and consequently on a spectral analysis applied thereon or frequency-dependent selection of individual spectral signal components thereof, cavitation possibly occurring in the flowing fluid can be ascertained with sufficiently good accuracy and reliability for purposes of issuing alarms. This can also be accomplished over a very broad Reynolds number range, thus both for laminar as well as also for turbulent flow. An advantage of the invention is especially that, in such case, for implementing the cavitation detection/signalizing of the invention, both operationally proven, conventional measuring transducers, as well as also operationally proven, conventional transmitter electronics—adapted, of course, as regards the software implemented for the evaluation of the invention—can be used.

BRIEF DESCRIPTION OF THE DRAWINGS

The invention as well as other advantageous embodiments thereof will now be explained in greater detail on the basis of examples of embodiments presented in the figures of the drawing. Equal parts are provided in all figures with equal reference characters; when perspicuity requires such or it otherwise appears sensible, already mentioned reference characters are omitted in subsequent figures. Other advantageous embodiments or further developments, especially also combinations of aspects of the invention first explained only individually, will become further evident from the figures of the drawing, as well as also on the basis of the dependent claims as such. The figures of the drawing show as follows:

FIG. 1a, FIG. 1b show, in different side views, a variant of a measuring system embodied as a compact measuring device for fluids flowing in pipelines;

DETAILED DISCUSSION IN CONJUNCTION WITH THE DRAWINGS

Figures 2A, 2B:
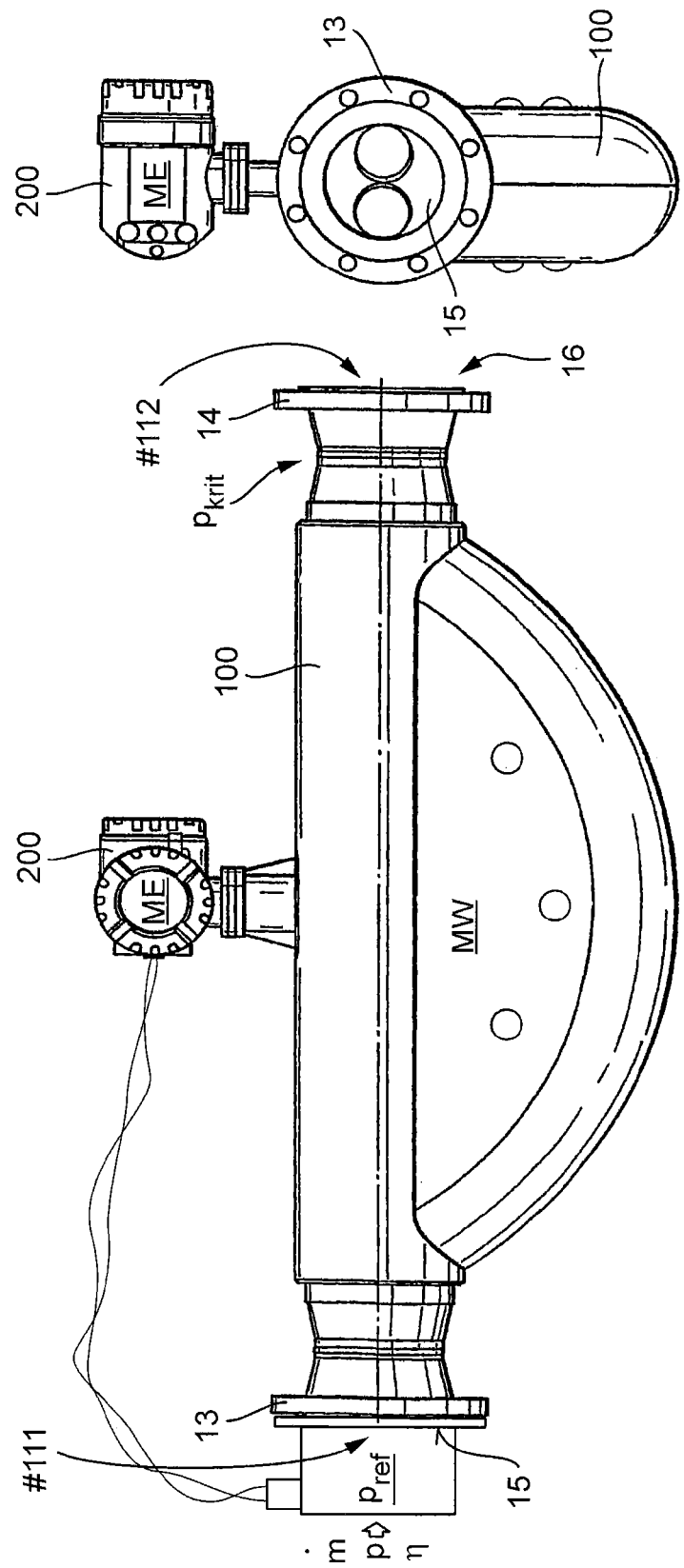
FIG. 2a, FIG. 2b show, in different side views, another variant of a measuring system embodied as a compact measuring device for fluids flowing in pipelines.
Figure 3:
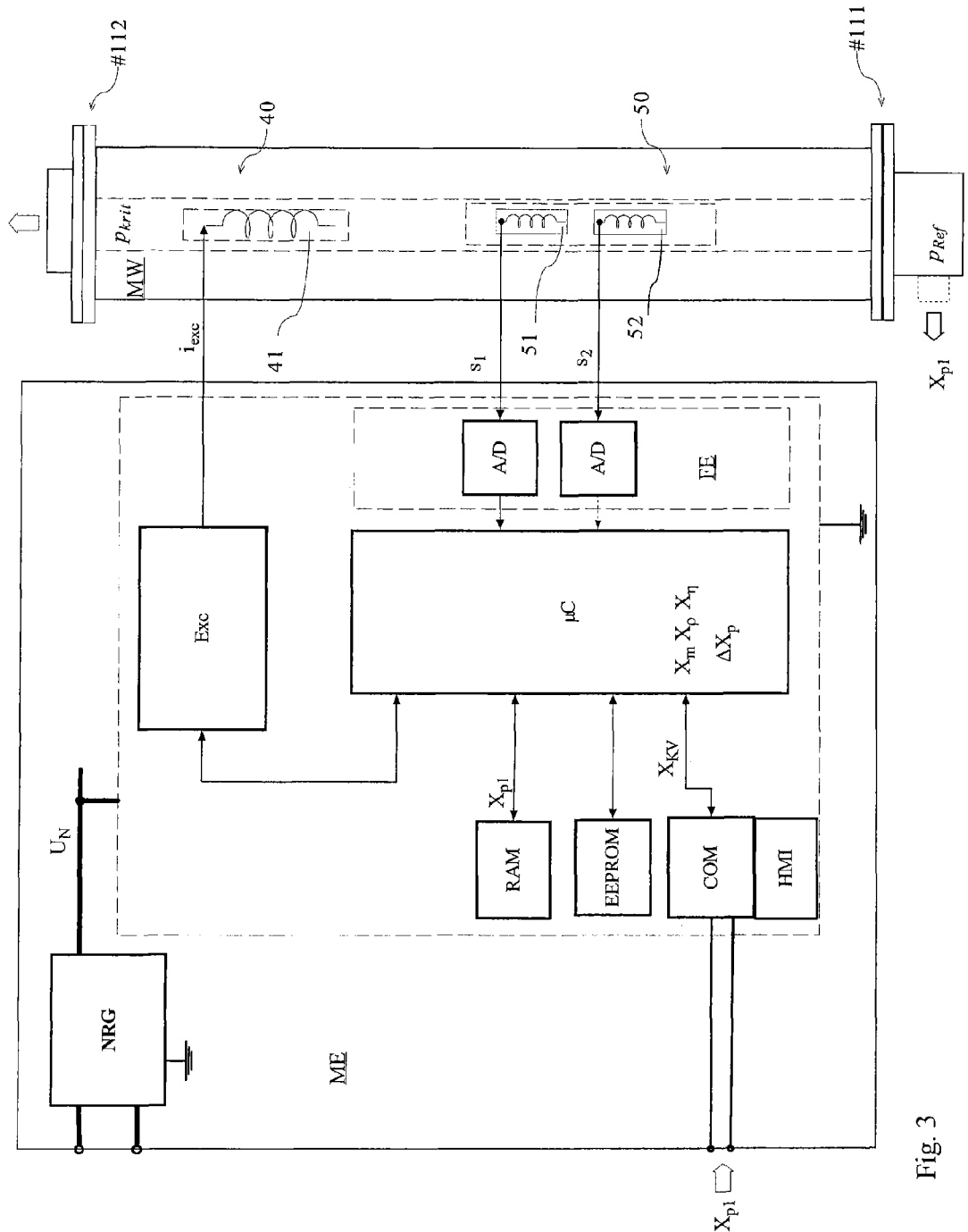
FIG. 3 shows schematically in the manner of a block diagram, a transmitter electronics, and connected thereto, a measuring transducer of vibration type, especially a transmitter electronics suitable for a measuring system according to FIGS. 1a, 1b, 2a, 2b.

FIGS. 1a, 1b, or 2a, 2b show, in each case, a variant of a measuring system suitable for fluids, consequently for liquids or pastes, which is insertable in a process line, for instance, a pipeline of an industrial plant, for example, a measuring system formed by means of a Coriolis mass flow measuring device, a density measuring device, a viscosity measuring device or the like, which serves especially detecting cavitation occurring in a fluid flowing in the process line, in given case also of for measuring and/or monitoring at least one additional physical measured variable of the fluid, such as, for instance, a mass flow rate and/or a density, etc. The measuring system, implemented here by means of an in-line measuring device in compact construction, comprises therefor a measuring transducer MT of vibration type connected to the process line via an inlet end #111 as well as an outlet end #112, there correspondingly flowing through this measuring transducer during operation the fluid to be measured, such as, for instance, a low-viscosity liquid and/or a high-viscosity paste and/or a gas, and this measuring transducer being connected to a transmitter electronics TE of the measuring system, especially a transmitter electronics supplied during operation with electrical energy from outside via connecting cables and/or internally by means of an energy storer. The transmitter electronics includes, as shown in FIG. 3 schematically in the manner of a block diagram, a driver circuit Exc serving for activating the measuring transducer MT, as well as a measuring and evaluating circuit μC of the measuring system for processing oscillation signals of the measuring transducer MT. The measuring and evaluating circuit μC is formed, for example, by means of a microcomputer, and/or communicates during operation with the driver circuit Exc. During operation, the measuring and evaluating circuit μC delivers measured values representing at least one measured variable, such as, for example, instantaneous or totaled mass flow. The driver circuit Exc and the evaluating circuit μC, as well as other electronics components of the transmitter electronics serving the operation of the measuring system, such as, for instance, internal energy supply circuits ESC for providing internal supply voltages $U_N$ and/or communication circuits COM serving for connection to a superordinated measurement data processing system and/or to a fieldbus, are additionally accommodated in a corresponding electronics housing 200, especially a housing embodied in an impact and/or also explosion resistant and/or hermetically sealed manner. For visualization of measured values produced internally in the measuring system and/or, in given cases, status reports generated internally in measuring system, such as, for instance, an error report or an alarm, the measuring system can furthermore have on-site a display and operating element HMI, which communicates at least at times with the transmitter electronics. The display and operating element can include, for instance, an LCD, OLED or TFT display placed in the electronics housing behind a window correspondingly provided therein, as well as a corresponding input keypad and/or a touchscreen. In advantageous manner, the transmitter electronics TE—especially a programmable and/or remotely parameterable transmitter electronics—can additionally be designed in such a manner, that, during operation of the in-line measuring device, it can exchange measuring data and/or other operating data, such as, for instance, current measured values or tuning and/or diagnostic values serving for control of the in-line measuring device, with a superordinated electronic data processing system—for example, a programmable logic controller (PLC), a personal computer and/or a work station—via a data transmission system, for example, a fieldbus system and/or wirelessly per radio. In such case, the transmitter electronics TE can have, for example, an internal energy supply circuit ESC, which is fed during operation via the aforementioned fieldbus system by an energy supply provided externally in the data processing system. In an embodiment of the invention, the transmitter electronics is additionally embodied in such a manner that it is electrically connectable by means of a two-wire-connection 2L—for example, configured as a 4-20 mA-current loop—with the external electronic data processing system and can be supplied thereby with electrical energy. Measured values as well can be transmitted thereover to the data processing system. For the case in which the measuring system is to be coupled to a fieldbus or other communication system, the transmitter electronics TE can have a corresponding communication interface COM for data communication according to one of the relevant industry standards. The electrical connecting of the measuring transducer to the transmitter electronics can occur by means of corresponding connecting lines, which are led out from the electronics housing 200, for example, via a cable feed-through, and extend at least sectionally within the measuring transducer housing. The connecting lines can, in such case, be embodied at least partially as electrical wires, at least sectionally encased in an electrical insulation, e.g. in the form of "twisted-pair" lines, flat ribbon cables and/or coaxial cables. Alternatively thereto or in supplementation thereof, the connecting lines can at least sectionally also be formed by means of conductive traces of an especially flexible—in given cases lacquered—circuit board; compare to this also the previously mentioned U.S. Pat. Nos. 6,711,958 or 5,349,872.

For further explanation of the invention, FIGS. 4 and 5, or 6 and 7 schematically show first and second examples of embodiments of a measuring transducer MT of vibration type suited for implementation of the measuring system. The measuring transducer MT serves generally for producing in a fluid flowing through—for instance, a gas and/or a liquid—mechanical reaction forces, e.g. mass flow dependent Coriolis forces, density dependent inertial forces and/or viscosity dependent frictional forces, which react measurably on the measuring transducer, especially in a manner registerable by sensor. Derived from these reaction forces, a mass flow m, a density $\rho$ and/or a viscosity $\eta$ of the fluid, for example, can be measured. Each measuring transducer includes therefor an inner part arranged in a measuring transducer housing 100 for actually effecting the physical-electrical transducing of the at least one parameter to be measured. In addition to accommodating the inner part, the measuring transducer housing 100 can furthermore also serve to hold the electronics housing 200 of the in-line measuring device with the therein accommodated driver and evaluating circuits.

Figure 4:
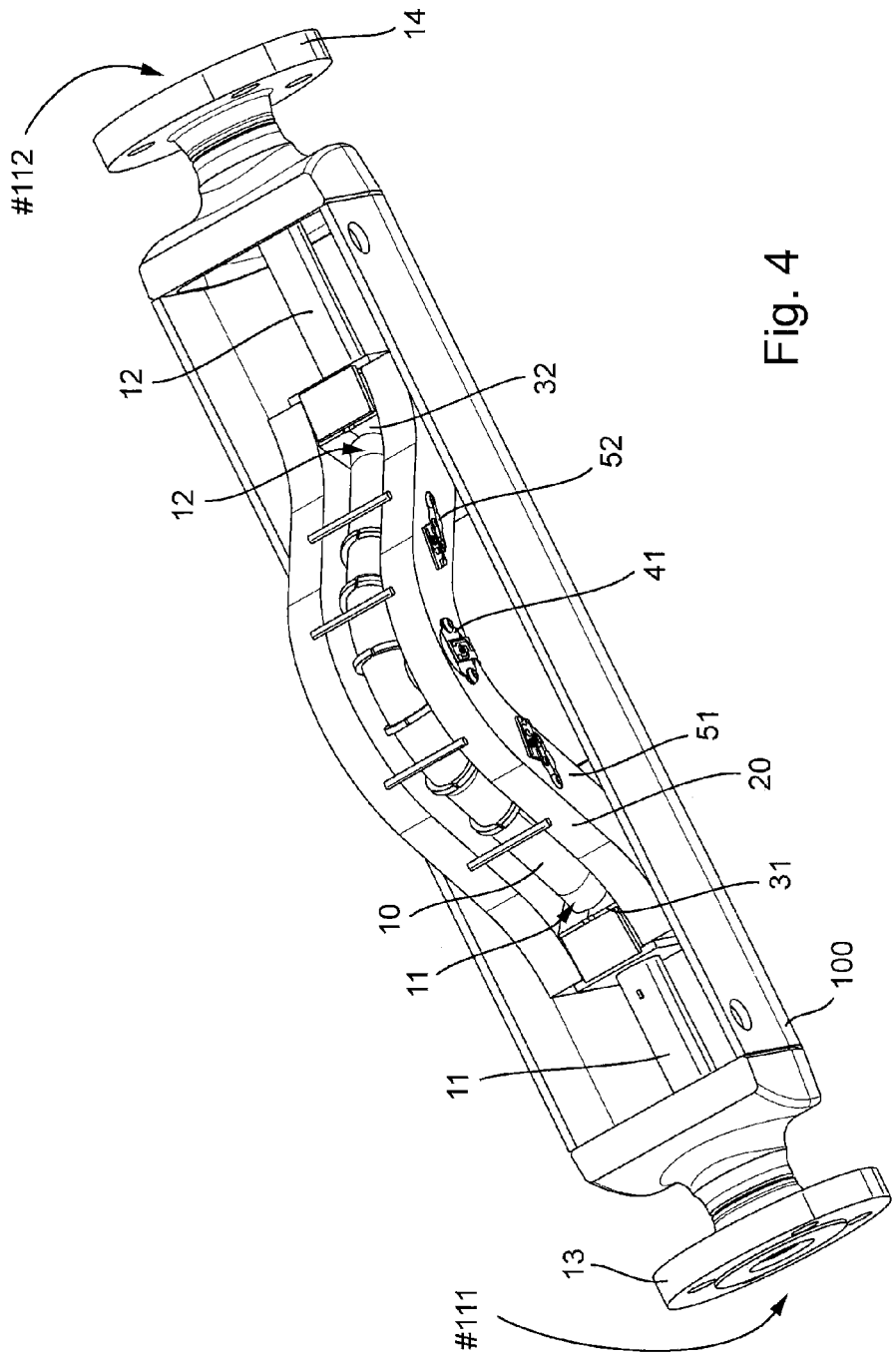
FIG. 4 and FIG. 5 show in partially sectioned or perspective views, a variant of a measuring transducer of vibration type, especially a measuring transducer suitable for a measuring system according to FIGS. 1a, 1b.
Figure 5:
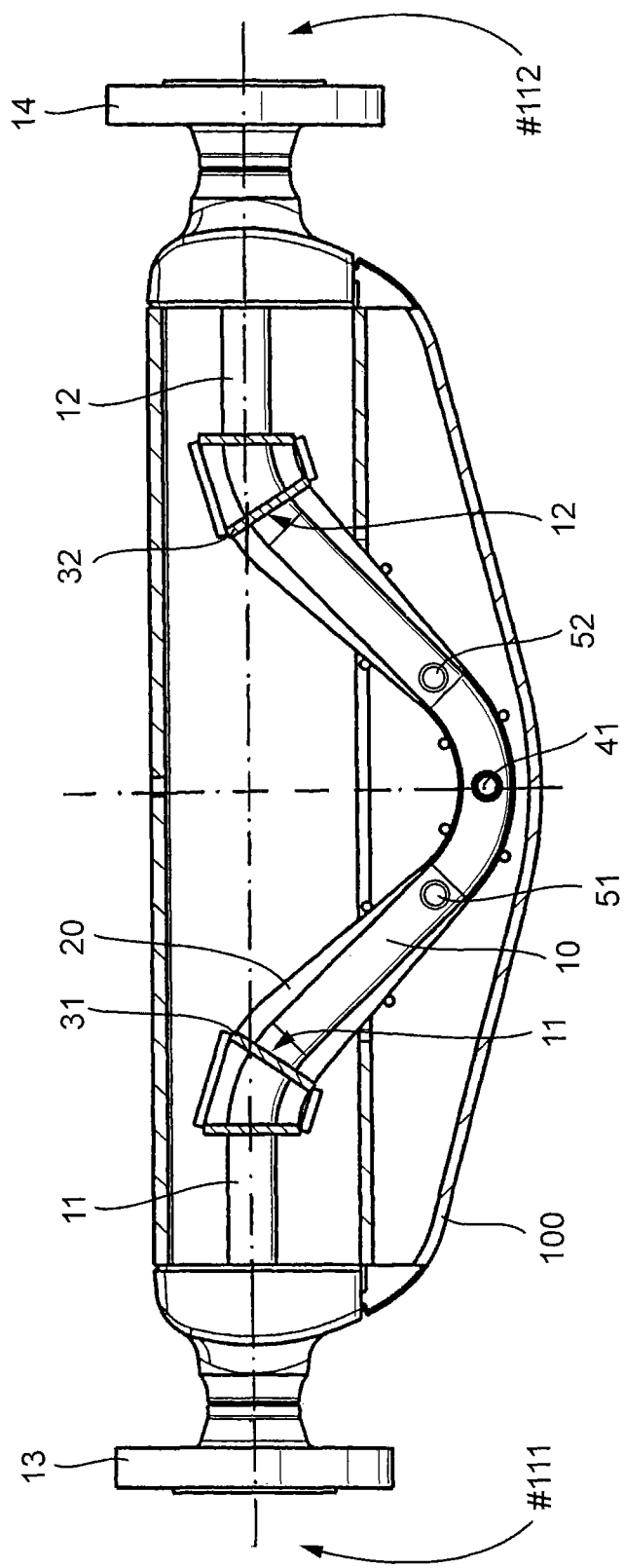
Figure 6:
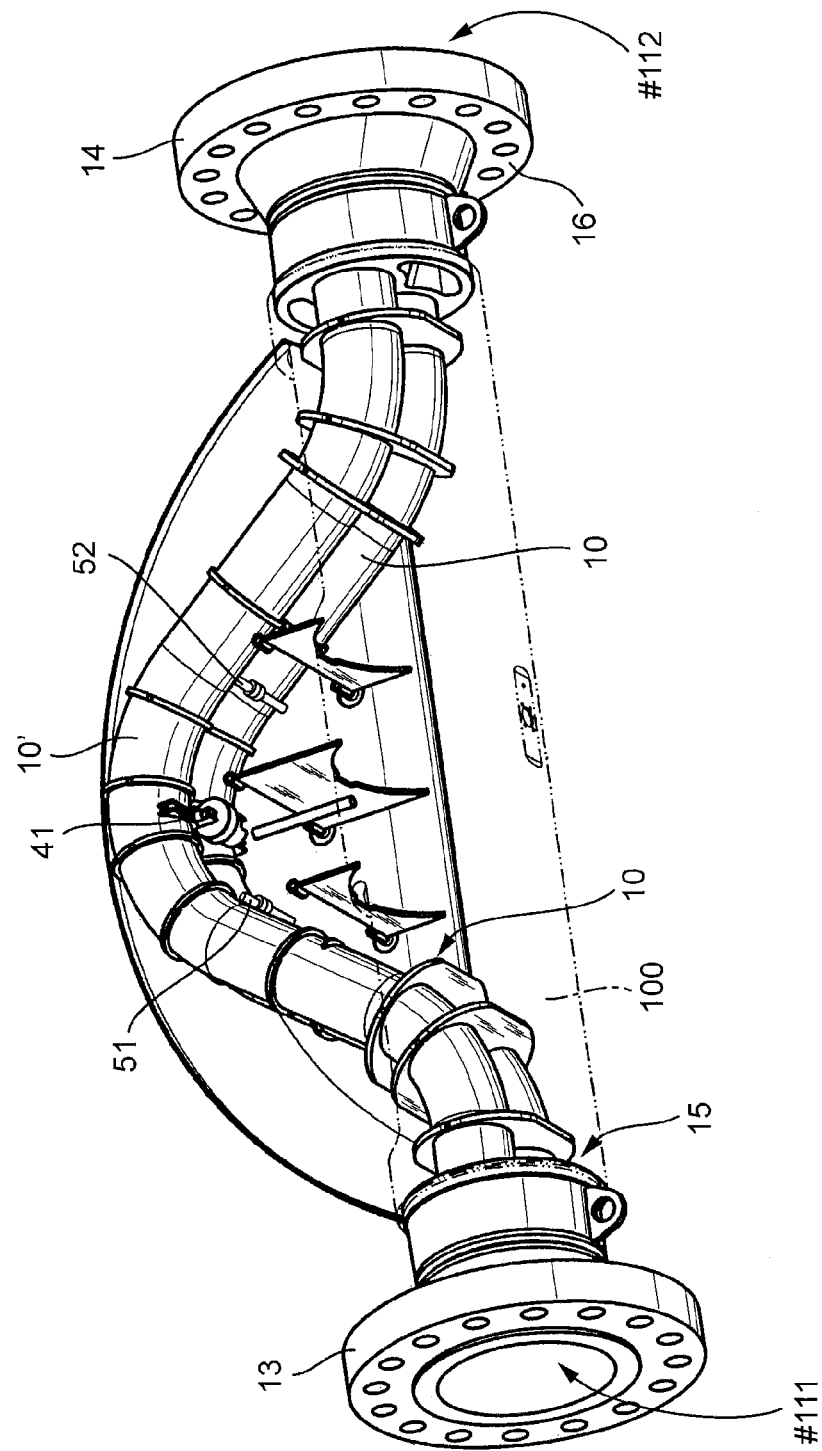
FIG. 6 and FIG. 7 show in partially sectioned or perspective views, another variant of a measuring transducer of vibration type, especially a measuring transducer suitable for a measuring system according to FIGS. 2a, 2b.
Figure 7:
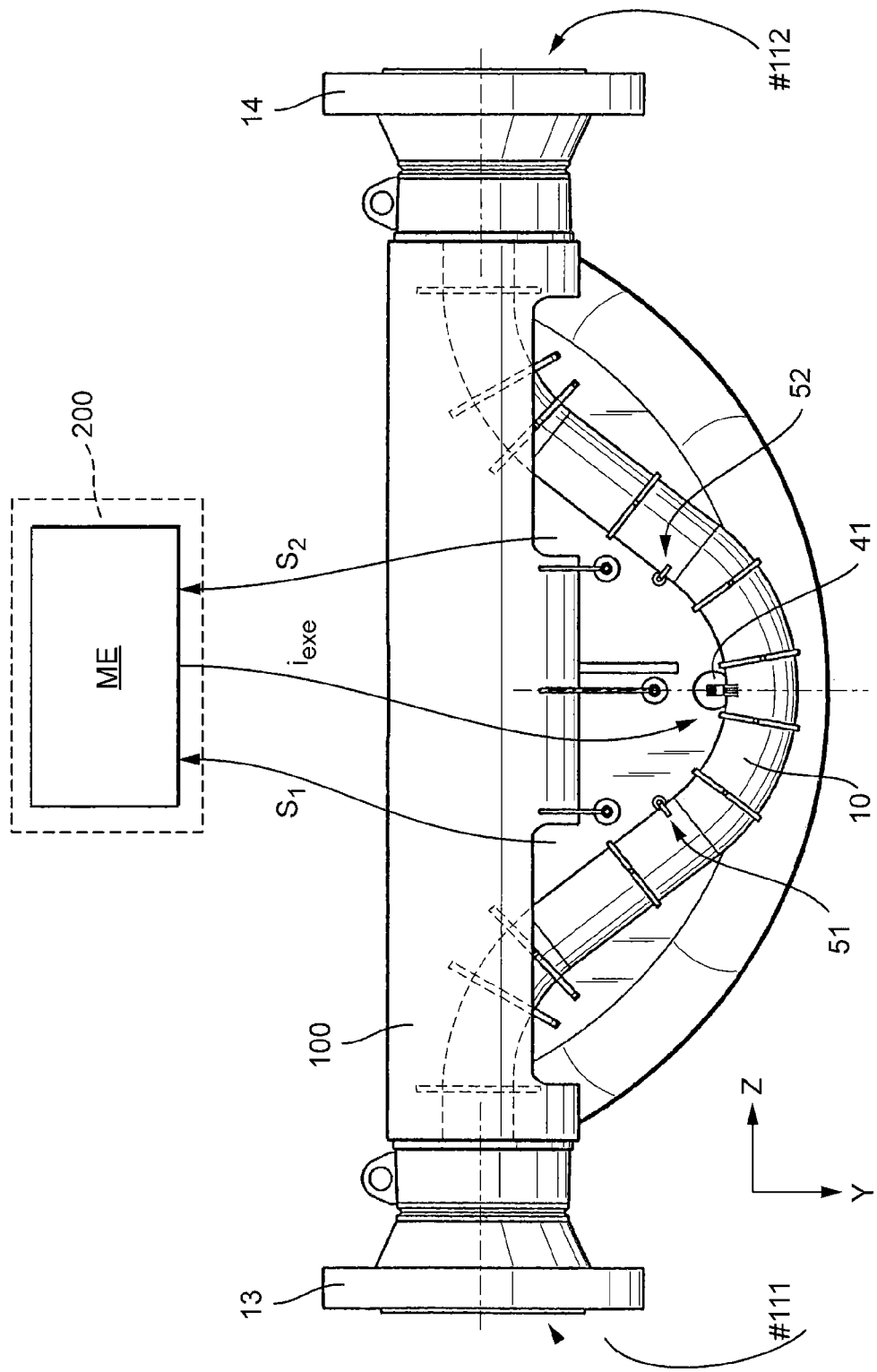

For conveying flowing fluid, the inner part of the measuring transducer generally comprises at least a first—in the example of an embodiment illustrated in FIGS. 4 and 5, a single, at least sectionally curved—measuring tube 10, which extends with a wanted oscillatory length between an inlet-side, first measuring tube end 11# and an outlet-side, second measuring tube end 12#, and which, for producing the aforementioned reaction forces during operation, is caused to vibrate at least over its wanted oscillatory length and is, in such case, repeatedly elastically deformed, oscillating about a static rest position. The wanted oscillatory length corresponds, in such case, to a length of an imaginary central (or also centroidal) axis extending within the lumen, and forming an imaginary connecting line through the centers of gravity of all cross sectional areas of the measuring tube; in the case of a curved measuring tube, thus a stretched length of the measuring tube 10.

It should be expressly noted here that although the measuring transducer in the example of an embodiment illustrated in FIGS. 4 and 5 has only a single, curved measuring tube and at least in this respect resembles in its mechanical construction as well as also in its principle of action that measuring transducer proposed in U.S. Pat. Nos. 7,360,451 or 6,666,098, or also that of measuring transducers available from the assignee under the type designation "PROMASS H", "PROMASS P" or "PROMASS S", measuring transducers with a straight measuring tube and/or more than one measuring tube can, of course, also serve for implementing the invention; compare, for instance, those designs disclosed in the previously mentioned U.S. Pat. Nos. 6,006,609, 6,513,393, 7,017,424, 6,840,109, 6,920,798, 5,796,011, 5,731,527 or 5,602,345, or, for example, also those measuring transducers available from the assignee under the type designation "PROMASS I", "PROMASS M", or "PROMASS E" or "PROMASS F", in each case having two parallel measuring tubes. In accordance therewith, the measuring transducer can also have a single, straight measuring tube or at least two measuring tubes which are, for example, mechanically coupled with one another by means of an inlet-side flow divider and an outlet-side flow divider, and in given cases also supplementally by means of at least one inlet-side coupling element and at least one outlet-side coupling element, and/or equally constructed to one another and/or curved and/or parallel to one another, for conveying fluid to be measured, and vibrating during operation, at least at times, for producing the oscillation signals; for instance, oscillation signals of an equal, shared oscillation frequency, but of mutually opposite phase. In a further development of the invention, the measuring transducer, such as, for instance, as schematically presented in FIGS. 6 and 7, consequently has, in addition to the first measuring tube 10, a second measuring tube 10', which, for forming a first coupling zone, is mechanically connected with the first measuring tube 10 on the inlet-side by means of a first coupling element, which is, for example, plate-shaped; and for forming a second coupling zone, on the outlet-side by means of a second coupling element, which is, for example, plate-shaped, and/or equally constructed to the first coupling element. Also in this case, the first coupling zone thus in each case defines an inlet-side, first measuring tube end 11#, 11#' of each of the two measuring tubes 10, 10' and the second coupling zone in each case defines an outlet-side, second measuring tube end 12#, 12'# of each of the two measuring tubes 10, 10'. Since, for the case in which the inner part is formed by means of two measuring tubes, each of the two measuring tubes 10, 10' (especially measuring tubes 10, 10', which, during operation, oscillate with essentially opposite phase relative to one another and/or are mutually parallel and/or equally constructed as regards shape and material) serves for conveying fluid to be measured, in an additional embodiment of this second variant of the measuring transducer of the invention, each of the two measuring tubes in each case opens on the inlet-side into one of two flow openings of a first flow divider 15, which are spaced apart from one another, and serve for dividing inflowing fluid into two flow portions. On the outlet-side, the measuring tubes in each case open into one of two flow openings of a second flow divider 16, which are spaced apart from one another, and which serve for guiding the flow portions back together, so that during operation, fluid thus flows simultaneously and in parallel through the two measuring tubes of the measuring system. In the example of an embodiment illustrated in FIGS. 6 and 7, the flow dividers are integral components of the measuring transducer housing, wherein the first flow divider forms an inlet-side, first housing end defining the inlet end #111 of the measuring transducer, and the second flow divider forms an outlet-side, second housing end defining the outlet end #112 of the measuring transducer.

As is directly evident from the combination of FIGS. 4 and 5 or 6 and 7, the at least one measuring tube 10 is, in each case, embodied in such a manner, that, as is quite usual in the case of measuring transducers of the type being is discussed, the aforementioned center line lies in an imaginary tube plane of the measuring transducer. According to an embodiment of the invention, the at least one measuring tube 10 is in such case, caused to vibrate during operation in such a manner that it oscillates, especially in a bending oscillation mode, about an oscillation axis which is parallel to or coincident with an imaginary connecting axis imaginarily connecting the two measuring tube ends 11#, 12#. The at least one measuring tube 10 is additionally embodied and arranged in the measuring transducer in such a manner that the aforementioned connecting axis extends essentially parallel to—and, in given cases, also coincides with—an imaginary longitudinal axis L of the measuring transducers imaginarily connecting the inlet and outlet ends of the measuring transducer.

The measuring transducer's at least one measuring tube 10—which is manufactured, for example, from stainless steel, titanium, tantalum, or zirconium or an alloy thereof—and, in this respect, also an imaginary center line of the measuring tube 10 extending within its lumen, can be e.g. essentially U-shaped, or, as is also shown in FIGS. 4 and 5 or 6 and 7, can be essentially V-shaped. Since the measuring transducer should be applicable for a multitude of most varied applications, especially in the field of industrial measurements and automation technology, it is additionally provided that the measuring tube, depending on application of the measuring transducer, has a diameter which lies in the range of between, for instance, 1 mm and, for instance, 100 mm.

For minimizing disturbing influences acting on an inner part formed by means of a single measuring tube, as well as also for reducing total oscillatory energy released from a measuring transducer to the connected process line, according to the example of an embodiment illustrated in FIGS. 4 and 5, the inner part of the measuring transducer furthermore comprises a counteroscillator 20 mechanically coupled with the—in this case, single, curved—measuring tube 10, and embodied, for example, similarly to the measuring tube, with a U or V-shape. Counteroscillator 20 is, as is also shown in FIG. 2, arranged in the measuring transducer laterally spaced apart from the measuring tube 10, and is affixed to measuring tube 10 on the inlet-side for forming a first coupling zone defining the aforementioned first measuring tube end 11#, and on the outlet-side for forming a second coupling zone defining the aforementioned second measuring tube end 12#. Counteroscillator 20—here a counteroscillator extending essentially parallel to the measuring tube 10, and, in given cases, also arranged coaxially thereto—is produced from a metal compatible with the measuring tube as regards thermal expansion, such as, for instance, steel, titanium, or zirconium, and can, in such case, also for example be tubular, or even essentially box-shaped. As is shown in FIG. 2, or, among other things, also provided in U.S. Pat. No. 7,360,451, counteroscillator 20 can be formed, for example, by means of plates arranged on the left and right sides of measuring tube 10 or also by blind tubes arranged on the left and right sides of measuring tube 10. Alternatively thereto, counteroscillator 20 can—as, for instance, is provided in U.S. Pat. No. 6,666,098—also be formed by means of a single blind tube extending laterally from the measuring tube, and parallel thereto. As is evident from a combination of FIGS. 2 and 3, counteroscillator 20 is, in the example of an embodiment illustrated here, held to the first measuring tube end 11# by means of at least one inlet-side, first coupler 31, and to the second measuring tube end 12# by means of at least one outlet-side, second coupler 32, especially one essentially identical to coupler 31. Serving in such case as couplers 31, 32 can, for example, be simple node plates, which are secured in an appropriate manner to measuring tube 10 and to counteroscillator 20 on the inlet-side and on the outlet-side, respectively. Additionally—as is provided in the case of the example of an embodiment illustrated in FIGS. 2 and 3—a completely closed box, in each case formed by means of node plates spaced apart from one another in the direction of the imaginary longitudinal axis L of the measuring transducer, together with protruding ends of the counteroscillator 20, can serve on the inlet-side and on the outlet-side as coupler 31, or as coupler 32, as the case may be, or, in given cases, the counteroscillator can also be a partially open framework. As is schematically presented in FIGS. 2 and 3, measuring tube 10 is additionally connected via a straight, first connecting tube piece 11 opening on the inlet-side in the region of the first coupling zone, and via a straight, second connecting tube piece 12 opening on the outlet-side in the region of the second coupling zone—tube piece 12 especially being essentially identical to the first connecting tube piece 11—to a process line (not shown) which supplies and drains the fluid, wherein an inlet end of the inlet-side connecting tube piece 11 essentially forms the inlet end of the measuring transducer, and an outlet end of the outlet-side connecting tube piece 12 forms the outlet end of the measuring transducer. In advantageous manner, measuring tube 10, including the two connecting tube pieces 11, 12 can be one piece, so that, for example, a single tubular stock or semifinished part of a material usual for such measuring transducers, such as, for example, stainless steel, titanium, zirconium, tantalum or corresponding alloys thereof, can serve for its manufacture. Instead of the measuring tube 10, inlet tube piece 11 and outlet tube piece 12 in each case being segments of a single, one-piece tube, these can, if required, also be produced by means of individual stocks or semifinished parts which are subsequently joined together, e.g. welded together. In the example of an embodiment illustrated in FIGS. 2 and 3, it is additionally provided, that the two connecting tube pieces 11, 12, are oriented relative to one another as well as to an imaginary longitudinal axis L of the measuring transducer imaginarily connecting the two coupling zones 11#, 12# in such a manner that the inner part formed here by means of the counteroscillator and measuring tube can move like a pendulum about the longitudinal axis L, accompanied by twistings of the two connecting tube pieces 11, 12. For such purpose, the two connecting tube pieces 11, 12 are oriented relative to one another in such a manner that the essentially straight tube segments extend essentially parallel to the imaginary longitudinal axis L or to the imaginary oscillation axis of the bending oscillations of the measuring tube, such that the tube segments essentially align both with the longitudinal axis L as well as also with one another. Since, in the example of an embodiment illustrated here, the two connecting tube pieces 11, 12 are essentially straight over their entire length, they are, as a whole, accordingly oriented essentially aligned with one another as well as with the imaginary longitudinal axis L. As is furthermore evident from FIGS. 2 and 3, the measuring transducer housing 100 is affixed, in a bending- and torsion-stiff and especially rigid manner—especially in comparison to the measuring tube 10—to a distal (as regards the first coupling zone) inlet end of the inlet-side connecting tube piece 11, as well as to a distal (as regards the first coupling zone outlet) end of the outlet-side connecting tube piece 12. In this respect, the entire inner part—here formed by means of measuring tube 10 and counteroscillator 20—is thus not only completely encased by the measuring transducer housing 100, but, as a result of its eigenmass and the spring action of both connecting tube pieces 11, 12, is also held in an oscillatable manner in the measuring transducer housing 100.

For the typical case, in which the measuring transducer MT is to be assembled releasably with the process line, for example, a process line in the form of a metal pipeline, the measuring transducer has on the inlet-side a first connecting flange 13 for connection to a line segment of the process line supplying fluid to the measuring transducer, and, on the outlet-side, has a second connecting flange 14 for connection to a line segment of the process line removing fluid from the measuring transducer. In such case, the connecting flanges 13, 14 can, as is quite usual in the case of measuring transducers of the described type, also be integrated terminally into the measuring transducer housing 100. In case required, connecting tube pieces 11, 12, can, moreover, also be connected directly with the process line, e.g. by means of welding or hard soldering. In the example of an embodiment illustrated in FIGS. 2 and 3, the first connecting flange 13 is formed on the inlet-side connecting tube piece 11 on its inlet end, and the second connecting flange 14 is formed on the outlet-side connecting tube piece 12 on its outlet end, while in the example of an embodiment illustrated in FIGS. 4 and 5, the connecting flanges are correspondingly connected with the associated flow dividers.

For active exciting of mechanical oscillations of the at least one measuring tube—or of the measuring tubes, as the case may be—specially at one or more of its—or their—natural eigenfrequencies, each of the measuring transducers illustrated in FIGS. 4 to 7 additionally comprises an electromechanical, especially an electrodynamic (thus formed by means of a plunging armature, coil pair, or solenoid), exciter mechanism 40. This in each case serves—operated by a correspondingly conditioned exciter signal, e.g. one having a controlled electrical current and/or a controlled voltage, delivered by the driver circuit of the transmitter electronics and, in given cases, in the interaction with the measuring and evaluating circuit—to convert electrical exciter energy, or power $E_{exc}$, fed by means of the driver circuit into an exciter force $F_{exc}$ acting, e.g. with pulse shape or harmonically, on the at least one measuring tube 10, and deflecting such in the above-described manner. The exciter force $F_{exc}$ can, as is usual in the case of such measuring transducers, be bidirectional or unidirectional, and can be set in manner known to those skilled in the art, e.g. as regards its amplitude by means of an electrical current and/or voltage control circuit, and, e.g. as regards its frequency by means of a phase control loop. Serving as exciter mechanism 40 can be e.g. an exciter mechanism 40 formed in the conventional manner by means of an oscillation exciter 41—for example, a single electrodynamic oscillation exciter—acting centrally, thus in the region of half of a wanted oscillatory length, on the respective measuring tube. The oscillation exciter 41 can, in the case of an inner part formed by means of counteroscillator and measuring tube, as shown in FIG. 4, be formed, for example, by means of a cylindrical exciter coil secured on the counteroscillator 20, wherein, during operation, a corresponding exciter current flows through this coil and wherein, associated therewith, the coil is permeated by a corresponding magnetic field, and also be formed by means of a permanently magnetic armature at least partially plunging into the exciter coil, this armature being affixed externally, especially at half-length, to the measuring tube 10. Other exciter mechanisms for oscillating the at least one measuring tube which are also quite suitable for the measuring system of the invention are shown e.g. in the previously mentioned U.S. Pat. Nos. 5,705,754, 5,531,126, 6,223,605, 6,666,098 or 7,360,451.

According to an additional embodiment of the invention, the at least one measuring tube 10 is at least at times actively excited during operation by means of the exciter mechanism to a wanted mode, in which it, especially predominantly or exclusively, executes bending oscillations about the static resting position inherent to the measuring tube, and consequently the aforementioned imaginary oscillation axis, for example, predominantly with exactly a natural eigenfrequency (resonance frequency) of the particular measuring transducer or the inner part of the measuring transducer in each case formed therewith, such as, for instance, that mode which corresponds to a natural bending oscillation fundamental mode inherent to said measuring transducer or the inner part in each case formed therewith, in which the at least one measuring tube has exactly one oscillatory antinode across its wanter oscillatory length. In such case, it is especially additionally provided that the at least one measuring tube 10, as is quite usual in the case of such measuring transducers with a curved measuring tube, is excited by means of the exciter mechanism to bending oscillations at an exciter frequency $f_{exc}$, in such a manner that it bends out in the wanted mode about the mentioned imaginary oscillation axis—for instance, in the manner of a cantilever clamped at one side—oscillating at least partially according to one of its natural bending oscillation forms. In such case, the bending oscillations of the measuring tube have an inlet-side oscillation node in the region of the inlet-side coupling zone defining the inlet-side measuring tube end 11#, and an outlet-side oscillation node in the region of the outlet-side coupling zone defining the outlet-side measuring tube end 12#, so that the measuring tube thus extends with its wanted oscillatory length essentially freely oscillating between these two oscillation nodes. According to an additional embodiment of the invention, it is in such case additionally provided that the wanted mode be selected in such a manner, so as to particularly excite the at least one measuring tube in such a manner, that, over a wanted oscillation length, this measuring tube at least partially executes bending oscillations with a single oscillatory antinode and/or bending oscillations at an instantaneously minimum bending oscillation resonance frequency inherent to said measuring tube, or in a natural bending oscillation mode inherent to said measuring tube, for instance, the mentioned bending oscillation fundamental mode.

For this, the driver circuit Exc provided in the transmitter electronics can be embodied, for example, as a phase control loop (PLL, or Phase Locked Loop), which is used in manner known to those skilled in the art to keep an exciter frequency, $f_{exc}$, of the exciter signal continually at the instantaneous eigenfrequency of the desired wanted mode. Construction and application of such phase control loops for active exciting of measuring tubes to oscillations at mechanical eigenfrequencies is described at length e.g. in U.S. Pat. No. 4,801,897. Of course, other driver circuits suitable for adjusting the exciter energy $E_{exc}$ and known as such to those skilled in the art can also be used, for example, also those mentioned in the previously set-forth state of the art, for instance, the previously mentioned U.S. Pat. Nos. 4,777,833, 4,801,897, 4,879, 911, 5,009,109, 5,024,104, 5,050,439, 5,804,741, 5,869,770, 6,073495 or 6,311,136. Additionally, as regards an application of such driver circuits for measuring transducers of vibration type, reference is made to the transmitter electronics provided with measurement transmitters of the series "PROMASS 83", as are available from the assignee, for example, in connection with measuring transducers of the series "PROMASS E", "PROMASS F", "PROMASS H", "PROMASS I", "PROMASS P" or "PROMASS S". Their driver circuit is, for example, in each case embodied in such a manner that the lateral bending oscillations in the wanted mode are controlled to a constant amplitude, and thus are also largely independent of the density, $\rho$.

For causing the at least one measuring tube 10 to vibrate, the exciter mechanism 40, as already mentioned, is fed by means of a likewise oscillating exciter signal of adjustable exciter frequency, $f_{exc}$, so that an exciter current $i_{exc}$ appropriately controlled in its amplitude flows during operation through the exciter coil of the—here single—oscillation exciter acting on the measuring tube 10, whereby the magnetic field required for moving the measuring tube is produced. The driver—or also exciter—signal, or its exciter current $i_{exc}$ can, for example, be harmonically, multifrequently or also rectangularly formed. The exciter frequency $f_{exc}$ of the exciter current required for maintaining the bending oscillations of the at least one measuring tube 10 can, in the case of the measuring transducer illustrated in the example of an embodiment, be advantageously selected and set in such a manner that the laterally oscillating measuring tube 10 oscillates at least predominantly oscillates in the bending oscillation fundamental mode (bending oscillation mode of first order), and consequently oscillates over its wanted oscillation length with a single oscillatory antinode. In accordance therewith, according to an additional embodiment of the invention, the exciter signal $i_{exc}$—or at least a wanted signal component of said exciter signal $i_{exc}$ which dominates as regards a signal power and/or a signal voltage and which produces bending oscillations of the measuring tube—is generated in such a manner that it has a signal frequency which corresponds to an instantaneous resonance frequency of bending oscillations of the measuring tube, for example, an instantaneous resonance frequency of a bending oscillation mode of first order, in which the at least one vibrating measuring tube executes over its wanted oscillation length bending oscillations with exactly one oscillatory antinode, so that the at least one measuring tube, excited by the at least one oscillation exciter 41 so as to vibrate in the wanted mode, thus at least partially executes bending oscillations with an instantaneous resonance frequency. In other words, the exciter- or also wanted mode frequency $f_{exc}$, is set in such a manner that it corresponds as precisely as possible to an eigenfrequency of bending oscillations of the measuring tube 10 in the bending oscillation fundamental mode and is at least predominantly excited to this by means of the exciter signal. In the case of application of a measuring tube manufactured from stainless steel, especially Hastelloy, having a caliber of 29 mm, a wall thickness s of for instance 1.5 mm, a wanted oscillatory length of for instance 420 mm and a chordal length, measured between the two measuring tube ends, of 305 mm, the resonance frequency of the same measuring tube, which corresponds to the bending oscillation fundamental mode would, for example, in the case of a density of practically zero, e.g. in the case of a measuring tube filled only with air, be, for instance, 490 Hz.

In the example of an embodiment illustrated in FIGS. 4 and 5 having an inner part formed by means of a measuring tube and counteroscillator, the measuring tube 10 executes the bending oscillations actively excited by means of the exciter mechanism predominantly relative to the counteroscillator 20, especially at a shared oscillation frequency and mutually opposite phases. In the case of an exciter mechanism acting simultaneously—for example, differentially—both on the measuring tube as well as also on the counteroscillator, counteroscillator 20 is in such case also simultaneously excited to cantilever oscillations, and indeed in such a manner that it oscillates with equal frequency, but at least partially out of phase with—and especially essentially opposite phase to—the measuring tube 10 oscillating in the wanted mode. Additionally, measuring tube 10 and counteroscillator 20 are, in such case, especially matched to one another in such a manner or excited in such a manner, that, during operation, they at least at times and at least partially execute bending oscillations in an opposite-equal manner—thus with equal frequency, but essentially opposite phase—about the longitudinal axis L. The bending oscillations can, in such case, be embodied in such a manner that they are of equal modal order and, thus, at least in the case of resting fluid, essentially the same shape; in the other case of application of two measuring tubes, these are, as is usual in the case of measuring transducers of the type being discussed, actively excited by means of the exciter mechanism—especially an exciter mechanism acting differentially between the two measuring tubes 10, 10'—in such a manner, that, during operation, they at least at times execute opposite-equal bending oscillations about the longitudinal axis L. In other words, the two measuring tubes 10, 10', or measuring tube 10 and counteroscillator 20, in each case move relative to one another in the manner of oscillating tuning fork tines. For this case, according to an additional embodiment of the invention, the at least one electro-mechanical oscillation exciter is designed to excite and to maintain opposite-equal vibrations of the first measuring tube and the second measuring tube, especially bending oscillations of each of the measuring tubes, each oscillating about an imaginary oscillation axis imaginarily connecting the relevant first measuring tube end and the relevant second measuring tube end.

For the operationally provided case, in which the fluid is flowing in the process line and, thus, the mass flow m is different from zero, Coriolis forces are also induced in the fluid by means of the measuring tube 10 vibrating in the above described manner. The Coriolis forces, in turn, act on the measuring tube 10 and thus effect an additional deformation of the same, which is registerable by sensor. The deformation occurs essentially according to an additional natural eigenoscillation form of a higher modal order than the wanted mode. An instantaneous shape of this so-called Coriolis mode superimposed with equal frequency on the excited wanted mode is, in such case, also dependent on the instantaneous mass flow m, especially as regards amplitude. As is usual in the case of such measuring transducers with a curved measuring tube, the eigenoscillation form of the anti-symmetric twist mode, for example—thus that form, in the case of which the measuring tube 10, as already mentioned, also executes rotary oscillations about an imaginary rotary oscillation axis directed perpendicular to the bending oscillation axis and imaginarily intersecting the center line of the measuring tube 10 in the region of half the oscillatory length—can serve as the Coriolis mode.

For registering oscillations, especially bending oscillations, of the at least one measuring tube 10, for example also those in the Coriolis mode, the measuring transducer additionally includes, in each case, a corresponding sensor arrangement 50. The sensor arrangement comprises, as is also schematically presented in FIG. 4 to 7, a first oscillation sensor 51—for example, an electrodynamic oscillation sensor—which is here arranged spaced apart from the at least one oscillation exciter on the at least one measuring tube 10, and which delivers an oscillation measurement signal serving as a first primary signal $s_1$ of the measuring transducer, this signal representing vibrations of the measuring tube 10; for example, a voltage corresponding to the oscillations or an electrical current corresponding to the oscillations.

According to a further development of the invention, the sensor arrangement additionally includes, arranged spaced apart from the first oscillation sensor 51 on the at least one measuring tube 10, a second oscillation sensor 52, especially an electrodynamic second oscillation sensor 52, which likewise delivers an oscillation measurement signal serving as a second primary signal $s_2$ of the measuring transducer representing vibrations of the measuring tube 10. A length of the region of the associated at least one measuring tube which extends between the two (for example, equally constructed) oscillation sensors, especially an essentially freely oscillatingly vibrating region of the measuring tube, corresponds in such case to a measuring length of the respective measuring transducer. In such case, each of the—here, two, typically broadband—oscillation signals $s_1$, $s_2$ of the measuring transducer MT in each case has a signal component which corresponds to the wanted mode and has a signal frequency corresponding to the instantaneous oscillation frequency $f_{exc}$ of the at least one measuring tube 10 oscillating in the actively excited wanted mode, and has a phase shift dependent on the current mass flow of the fluid flowing in the at least one measuring tube 10 measured relative to the exciter signal $i_{exc}$, generated, for example, by means of the PLL-circuit as a function of a phase difference existing between at least one of the oscillation measurement signals $s_1$, $s_2$ and the exciter current in the exciter mechanism. Even in the case of application of a rather broadband exciter signal $i_{exc}$, as a result of the most often very high oscillation quality factor of the measuring transducer MT, it can be assumed that the signal component of each of the oscillation signals corresponding to the wanted mode predominates over other signal components, especially signal components corresponding to possible external disturbances and/or classified as noise, and, in this respect, is also dominant at least within a frequency range corresponding to a bandwidth of the wanted mode.

In the examples of embodiments illustrated here, the first oscillation sensor 51 is in each case arranged on the at least one measuring tube 10 on the inlet-side, and the second oscillation sensor 52 is arranged on the at least one measuring tube 10 on the outlet-side, especially with the second oscillation sensor 52 being just as widely spaced apart from the at least one oscillation exciter of—or from the half-length plane of—the measuring tube 10 as is the first oscillation sensor 51. As is quite usual in the case of such measuring transducers of vibration type used in measuring systems which are formed as Coriolis mass flow measuring devices, according to an embodiment of the invention, the first oscillation sensor 51 and the second oscillation sensor 52 are additionally in each case arranged in the measuring transducer on a side of the measuring tube occupied by the oscillation exciter 41. Furthermore, the second oscillation sensor 52 also can be arranged in the measuring transducer on the side of the measuring tube occupied by the first oscillation sensor 51. The oscillation sensors of the sensor arrangement can, in advantageous manner, additionally be embodied in such a manner that they deliver the same type of oscillation signals; for example, in each case deliver a signal voltage or a signal current. In an additional embodiment of the invention, both the first oscillation sensor as well as also the second oscillation sensor are in each case additionally placed in the measuring transducer MT in such a manner that each of the oscillation sensors at least predominantly registers vibrations of the at least one measuring tube 10. For the above described case, in which the inner part is formed by means of a measuring tube and a counteroscillator coupled therewith, according to an additional embodiment of the invention, both the first oscillation sensor as well as also the second oscillation sensor are embodied in such a manner, and placed in the measuring transducer in such a manner that each of the oscillation sensors predominantly registers—for example, differentially registers—oscillations of the measuring tube relative to the counteroscillator, such that both the first primary signal $s_1$ as well as also the second primary signal $s_2$, thus represent oscillatory movements, especially opposite-equal oscillatory movements, of the at least one measuring tube 10 relative to the counteroscillator 20. For the other described case, in which the inner part is formed by means of two measuring tubes, especially measuring tubes oscillating opposite-equally during operation, according to another embodiment of the invention, both the first oscillation sensor as well as also the second oscillation sensor are embodied in such a manner and placed in the measuring transducer in such a manner that each of the oscillation sensors predominantly registers—for example, differentially registers—oscillations of the first measuring tube 10 relative to the second measuring tube 10', so that both the first primary signal $s_1$ as well as also the second primary signal $s_2$ thus represent oscillatory movements, especially opposite-equal oscillatory movements, of the two measuring tubes relative to one another, especially in such a manner that, as usual in the case of conventional measuring transducers, the first primary signal produced by means of the first oscillation sensor represents inlet-side vibrations of the first measuring tube relative to the second measuring tube, and the second primary signal produced by means of the second oscillation sensor represents outlet-side vibrations of the first measuring tube relative to the second measuring tube. In an additional embodiment of the invention, it is additionally provided that the sensor arrangement has exactly two oscillation sensors—thus there are no additional oscillation sensors beyond the first and second oscillation sensors—and, in this respect, thus corresponds to conventional sensor arrangements for measuring transducers of the type being discussed as regards the components used.

The oscillation measurement signals $s_1$, $s_2$, which are delivered by the sensor arrangement, which serve as the first and second oscillation signals, respectively, and which have, in each case, a signal component signal frequency corresponding to an instantaneous oscillation frequency $f_{exc}$ of the at least one measuring tube 10 oscillating in the actively excited wanted mode, are, as is also shown in FIG. 3, fed to the transmitter electronics TE and are there then to fed to the therein provided measuring- and evaluating circuit μC. First, the signals are preprocessed, especially preamplified, filtered and digitized by means of a corresponding input circuit IE, in order then to be able to be suitably evaluated. In such case, circuit technologies (for example, also such circuits according to the previously mentioned state of the art) already applied and established in conventional Coriolis mass flow measuring devices for the purpose of converting the oscillation signals, or of ascertaining mass flow rates and/or totaled mass flows, etc., can be used as input circuit IE, as well as also as measuring and evaluating circuit μC. According to an additional embodiment of the invention, the measuring and evaluating circuit μC is accordingly also implemented by means of a microcomputer—for example, a digital signal processor (DSP)-provided in the transmitter electronics TE, and by means of program-code correspondingly implemented and running therein. The program code can be stored persistingly, e.g. in a non-volatile data memory EEPROM of the microcomputer and, upon the starting-up of the same, can be loaded into a volatile data memory RAM, e.g. integrated in the microcomputer. For such applications, suitable processors include, for example, those of type TMS320VC33, as available from the firm Texas Instruments Inc. Of course, the oscillation signals $s_1$, $s_2$, are, as already indicated, to be converted into corresponding digital signals by means of corresponding analog-to-digital converters A/D of the transmitter electronics TE for processing in the microcomputer; compare to this, for example, the previously mentioned U.S. Pat. Nos.

6,311,136 or 6,073,495, or also the aforementioned measurement transmitters of the series "PROMASS 83".

Figure 8:
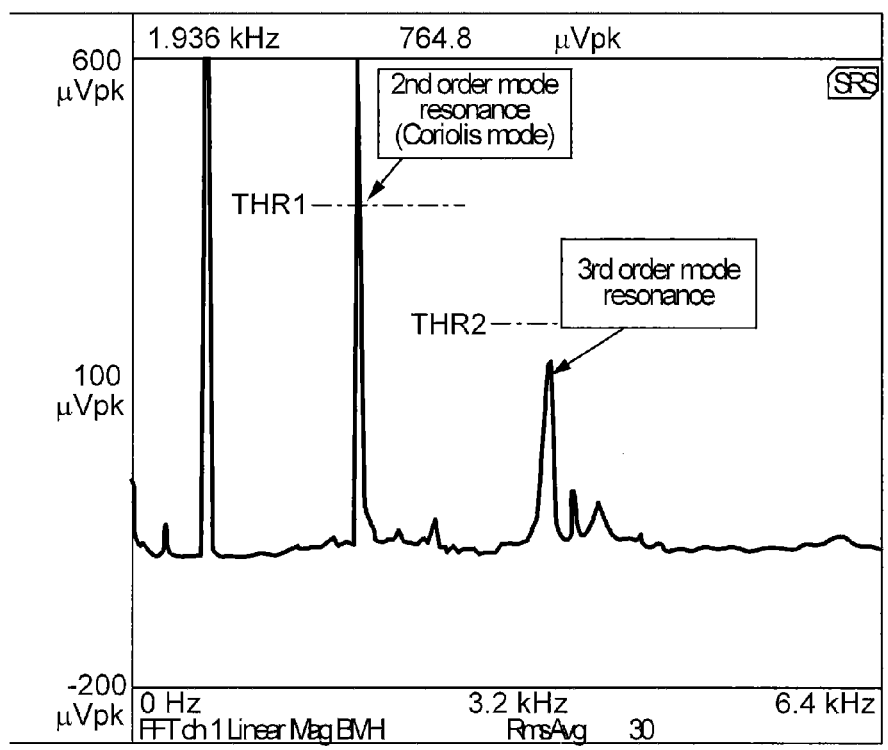
FIG. 8 to FIG. 12 show the results of experimental investigations performed in connection with the invention, especially results obtained making use of computer-based simulation programs and/or results obtained by means of real measuring systems in the laboratory, or characteristic curves derived therefrom, serving for ascertaining pressure difference in a fluid flowing through a measuring transducer of vibration type, for instance, one according to FIG. 4, 5, or 6, 7.

In the case of the measuring system of the invention, the transmitter electronics TE, as already mentioned, especially also serves to generate, by means of the at least one oscillation signal, a cavitation report $X_{KV}$—also, for instance, declared an alarm—which signals, for example in a visually and/or acoustically perceivable manner, an occurrence of most often damaging or undesired cavitation in the fluid. The transmitter electronics TE is especially adapted to produce the cavitation report based on a first signal component of said oscillation signal. This first signal component represents a bending oscillation mode, in which the at least one vibrating measuring tube executes bending oscillations having at least one oscillatory antinode more than in the case of the bending oscillations in the wanted mode actively excited by means of the exciter mechanism; in the case of use of the bending oscillation fundamental mode as the wanted mode, thus bending oscillations with at least two oscillatory antinodes. For example, the signal frequency of the exciter signal $i_{exc}$ or of the wanted-signal component thereof can thus correspond to an instantaneous resonance frequency of the mentioned bending oscillation mode of first order, in which the at least one vibrating measuring tube executes over its wanted oscillation length bending oscillations with exactly one oscillatory antinode, and the first signal component of the oscillation signal, as is presented in FIG. 8 based on a spectrum for the oscillatory signal experimentally ascertained in the case of cavitation occurring in the flowing fluid, can have a signal frequency which is greater than the signal frequency of the exciter signal corresponding to the instantaneous resonance frequency of the bending oscillation mode of first order; for example, corresponding to an instantaneous resonance frequency of a natural bending oscillation mode inherent to the measuring tube, in which the measuring tube executes bending oscillations with exactly one oscillatory antinode more than in the case of the bending oscillations in the wanted mode. The latter natural bending oscillation mode can thus, for example, be a natural bending oscillation mode (bending oscillation mode of second order), in which the at least one vibrating measuring tube executes, over its wanted oscillation length, bending oscillations with exactly two oscillation antinodes, and can thus consequently be the Coriolis mode. According to an additional embodiment of the invention, the transmitter electronics TE is in such case designed in such a manner that it, however, only generates the cavitation report when a magnitude of a signal voltage of the first signal component of the oscillation signal exceeds a threshold value THR1 predetermined therefor, for instance, one stored in the transmitter electronics and/or changeable during operation via corresponding input by the user.

According to an additional embodiment of the invention, the transmitter electronics TE additionally also generates the cavitation report by means of a second signal component of the oscillation signal, which represents a bending oscillation mode, in which the at least one vibrating measuring tube executes bending oscillations with at least one oscillatory antinode more than in the case of the bending oscillation mode represented by the first signal component, thus, for example, with three or more oscillation antinodes. Particularly for the mentioned case, in which the first signal component already represents bending oscillations in the second bending oscillation fundamental mode, namely at its instantaneous eigenfrequency, the second signal component of the oscillation signal can thus, for example, have a signal frequency—and that spectral component of the oscillatory signal having such can consequently be used as the second signal component—which corresponds to an instantaneous resonance frequency of that bending oscillation mode of third order, in which the at least one vibrating measuring tube executes bending oscillations with exactly two oscillation antinodes more than in the case of the bending oscillations in the wanted mode. In such case, it is especially provided, or the transmitter electronics TE is especially adapted in such a manner, that the cavitation report is only generated by the transmitter electronics TE when the magnitude of a signal voltage of the second signal component of the oscillation signal does not exceed a threshold value THR2 predetermined therefor, for example, a threshold value which is in turn changeable during operation and/or dependent on an instantaneous signal voltage of the first signal component of the oscillation signal. For the measuring transducer configuration shown in FIG. 8 and based on data, it could additionally be determined, that the threshold value THR1 for the magnitude of the signal voltage of the first signal component of the oscillation signal should advantageously, not least of all also for the purpose of preventing possible false alarms, be selected in such a manner, in given cases, also via corresponding recurring adaptation during operation of the measuring system, that it is greater—for example, more than twice as great—than an instantaneous magnitude of the signal voltage of the second signal component of the oscillation signal, or that the threshold value THR1 for the magnitude of the signal voltage of the first signal component of the oscillation signal and the threshold value THR2 for the magnitude the signal voltage of the second signal component of the oscillation signal should be selected in such a manner that a threshold value ratio, defined by a ratio of the threshold value for the magnitude of the signal voltage of the first signal component of the oscillation signal to the threshold value for the magnitude of the signal voltage of the second signal component of the oscillation signal, is greater than one; for example, greater than two. Alternatively or in supplementation, the transmitter electronics TE can, for example, also be adapted in such a manner that it only generates the cavitation report when a signal voltage ratio, defined by a ratio of a magnitude of a signal voltage of the first signal component of the oscillation signal to a magnitude of a signal voltage of the second signal component of the oscillation signal, exceeds a threshold value predetermined for said signal voltage ratio which, for instance, is in turn changeable during operation and/or dependent on an instantaneous signal voltage of the first signal component of the oscillation signal and/or dependent on an instantaneous signal voltage of the second signal component of the oscillation signal. Said threshold value for the signal voltage ratio can, in turn, be selected in a corresponding manner so as to be greater than one, especially greater than two.

Since the occurrence of cavitation can not least of all also be caused by the measuring transducer itself, or by a pressure drop in the flowing fluid which is provoked by the measuring transducer, according to an additional embodiment of the invention, the transmitter electronics is adapted—as is also provided in the applicant's own, not pre-published German patent applications DE102010000759.5, DE102010000760.9, or DE102010000761.7—so as to, by means of the first oscillation signal and/or by means of the exciter signal, as well as making use of a of a first pressure measured value $X_{p1}$ (for example, one held in the volatile data memory RAM provided in the transmitter electronics), which represents a first pressure $p_{Ref}$, especially a static first pressure, $p_{Ref}$, reigning in the flowing fluid, for example, upstream from the inlet end of the measuring transducer or downstream from the outlet end of the measuring transducer, to generate a second pressure measured value $X_{p2}$ (different from this first pressure measured value $X_{p1}$), which represents a static second pressure $p_{crit}$ reigning in the flowing fluid. The pressure $p_{Ref}$ represented by the first pressure measured value can, for example, be a static pressure on the inlet-side or on the outlet-side of the measuring transducer impressed by means of a correspondingly controlled pump conveying the flowing fluid forward, and/or set by means of a correspondingly controlled valve, while the pressure represented by the second pressure measured value $X_{p2}$ can, for example, be a minimal static pressure reigning within the fluid flowing through the measuring transducer, or arising downstream from the inlet end of the measuring transducer, and classified as critical for the measuring system as a whole. The first pressure measured value $X_{p1}$ can accordingly be ascertained in a very simple manner, for example, by sending it during operation from the mentioned superordinated data processing system to the transmitter electronics and/or to the transmitter electronics from a pressure sensor connected directly to the transmitter electronics, such that the pressure sensor forms a part of the measuring system. In the transmitter electronics, it can then be stored in the mentioned volatile data memory RAM and/or in the non-volatile data memory EEPROM.

Therefore, according to a further development, the measuring system additionally comprises a pressure sensor for registering a static pressure reigning in a pipeline conveying the fluid, for example, reigning upstream from the inlet end of the measuring transducer or downstream from the outlet end of the measuring transducer, this pressure sensor communicating with the transmitter electronics during operation, for example, via a direct point-to-point connection and/or wirelessly per radio. Alternatively thereto or in supplementation thereof, the pressure measured value $X_{p1}$ can, however, also be directly ascertained by means of the transmitter electronics on the basis of at least one of the oscillation signals of the measuring transducer, for example making use, among other things, of pressure measuring methods known from the previously mentioned U.S. Pat. Nos. 6,868,740, 5,734,112, 5,576,500, US-A 2008/0034893 or WO-A 95/29386, WO-A 95/16897.

In an additional embodiment of the invention, the transmitter electronics is additionally provided to monitor, based on the ascertained second pressure measured value $X_{p2}$, the measuring system or a thereto connected pipeline system for conditions critical for operation, for instance, the size of a pressure drop unavoidably brought about in the flowing fluid by the measuring transducer itself, and/or the risk associated therewith of most often damaging cavitation in the flowing fluid as a result of a too high pressure reduction. Taking this into consideration, according to an additional embodiment, the transmitter electronics of the invention is additionally designed so as to generate the cavitation report, also making use of the second pressure measured value $X_{p2}$, for instance in such a manner that the functionality of the transmitter electronics to generate the cavitation report is only activated in the case of exceeding a maximum allowable pressure drop, the cavitation report thus consequently only being capable of being generated for said situation, and/or in such a manner that in the case of a subceeding or falling beneath of a maximum allowable pressure drop, the functionality of the transmitter electronics to generate the cavitation report is in this respect deactivated, so that the cavitation report not is generated, although the first signal component would initially require this. Alternatively or in supplementation, the transmitter electronics can additionally be adapted so as to generate an alarm which suitably signals—for example in the vicinity of the measuring system in a visually and/or acoustically perceivable manner—a too low static pressure in the flowing fluid, and/or a subceeding or falling below of an earlier defined, minimal allowable static pressure in the fluid, and/or the occurrence—e.g. an impending occurrence—of cavitation in the fluid. The alarm can be displayed e.g. on-site by the mentioned display and operating element HMI, and/or be made audible by a signal horn controlled by means of the measuring system.

For producing the second pressure measured value $X_2$, according to an additional embodiment of the invention, it is provided that, making use of at least one oscillation measurement signal delivered by the measuring transducer and/or on the basis of the exciter signal, the transmitter electronics ascertains a pressure difference measured value $X_{\Delta p}$, which represents a pressure drop determined by the flow in the measuring transducer, or a pressure difference occurring between two predetermined reference points in the flowing fluid, and does so, for example, in such a manner that a first of the two reference points is located in the measuring transducer on the inlet-side, and a second of the two reference points is located in the measuring transducer on the outlet-side, and, in this respect, a pressure difference $\Delta p_{total}$ falling across the measuring transducer as a whole is ascertained. Alternatively thereto, the second reference point can, however, also be set in such a manner that it is located in the measuring transducer directly in a region of expected minimal static pressure, thus in a region of increased cavitation risk.

On the basis of the pressure difference measured value as well as the internally stored, first pressure measured value $X_{p1}$, the second pressure measured value $X_{p2}$, can be generated by means of the transmitter electronics, for example, by means of the function: $X_{p2} = X_{p1} - X_{\Delta p}$. For the case, in which the first pressure measured value $X_{p1}$ does not exactly represent that pressure in the fluid, which corresponds to one of the two reference points underlying the pressure difference measured value, for instance, because the pressure sensor delivering the pressure measured value $X_{p1}$ or the controlled pump delivering the pressure measured value $X_{p1}$ is farther removed from the inlet end of the measuring transducer, the pressure measured value $X_{p1}$ is, of course, to be correspondingly adjusted to the reference point, for instance, by corresponding subtraction or addition of a known pressure drop occurring between the measuring point corresponding to the pressure measured value $X_{p1}$ and the reference point defined by calibration of the measuring system. The pressure difference measured value can, furthermore, also be used during operation to monitor the measuring transducer and/or its pressure-lowering influence on the flow.

Therefore, in an additional embodiment, the transmitter electronics is designed to in given cases generate, making use of the pressure difference measured value, an alarm, which correspondingly signals—for instance, in a manner visually and/or acoustically perceivable on-site, an exceeding of an earlier defined maximum allowable sinking of a static pressure in the fluid flowing through the measuring transducer and/or a too high pressure drop $\Delta p_{total}$ in the fluid brought about by the measuring transducer.

The pressure difference measured value $X_{\Delta p}$ can be ascertained, for example, according to the method for measuring a pressure difference described in U.S. Pat. Nos. 7,305,892, or 7,134,348, performable by means of a measuring transducer of vibration type, for instance in such a manner that a pressure drop usable as a pressure difference measured value is ascertained in the fluid flowing through the measuring transducer on the basis of an oscillatory response of the at least one measuring tube to a multimodal oscillation excitation, as well as on the basis of physical-mathematical models furnished in the transmitter electronics for a dynamic of the measuring system (here embodied as a Coriolis mass flow measuring device). Alternatively thereto or in supplementation thereof, and by means of the second primary signal, as well as taking into consideration a Reynolds number ascertained for the flowing fluid, a pressure difference—such as, for example, a pressure drop in the flowing fluid which is provoked by the measuring transducer itself—occurring between two predetermined reference points in the flowing fluid, for example, also points located within the measuring transducer, is to be measured. For such purpose, by means of the first and second oscillation signals, as well as making use of an internally stored (for instance, in the volatile data memory RAM) Reynolds number, the transmitter electronics generates a measured value $X_{Re}$, which represents a Reynolds number Re for fluid flowing in the measuring transducer. The Reynolds number measured value $X_{Re}$ can, for example, be generated during operation directly in the transmitter electronics TE, by means of the exciter signal and/or by means of at least one of the oscillation signals, for example according to the method described in the previously mentioned U.S. Pat. No. 6,513, 393. Alternatively thereto or in supplementation thereof, the Reynolds number measured value $X_{Re}$, can, for example, also be transmitted by the mentioned electronic data processing system to the transmitter electronics TE.

Figure 9:
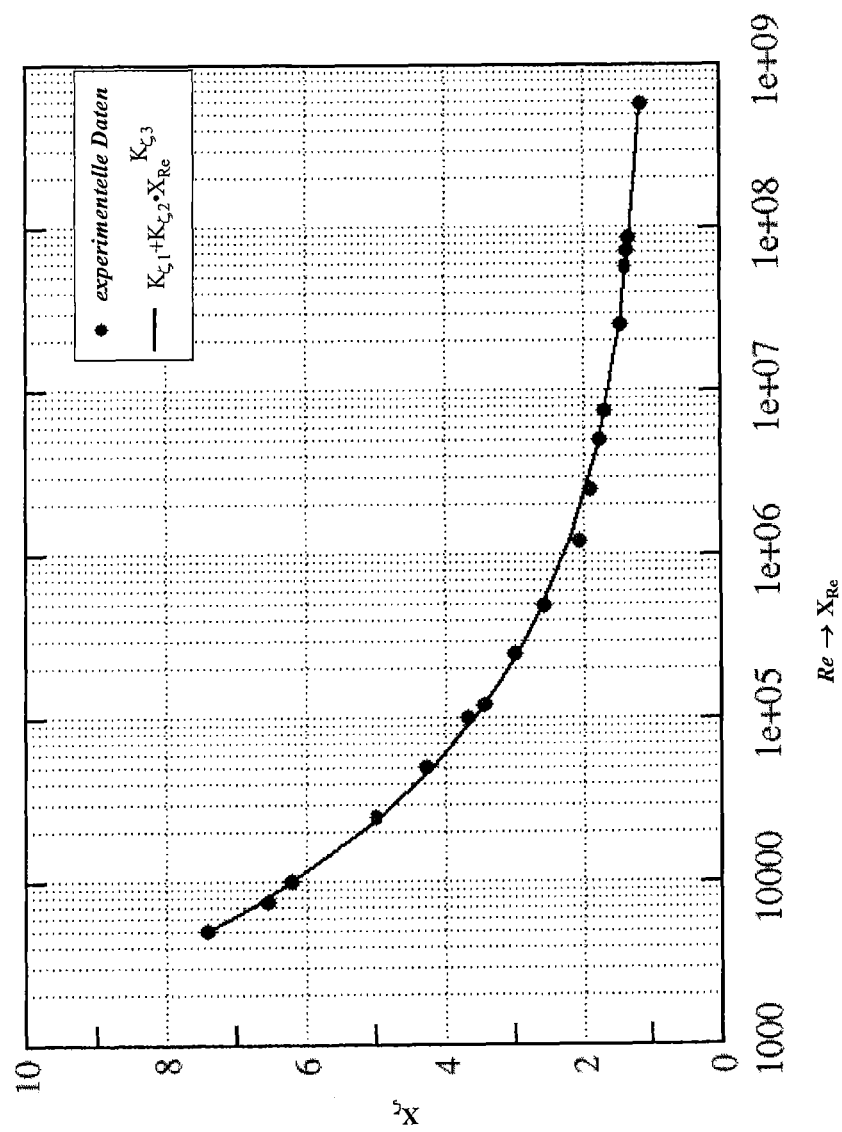
Figure 10:
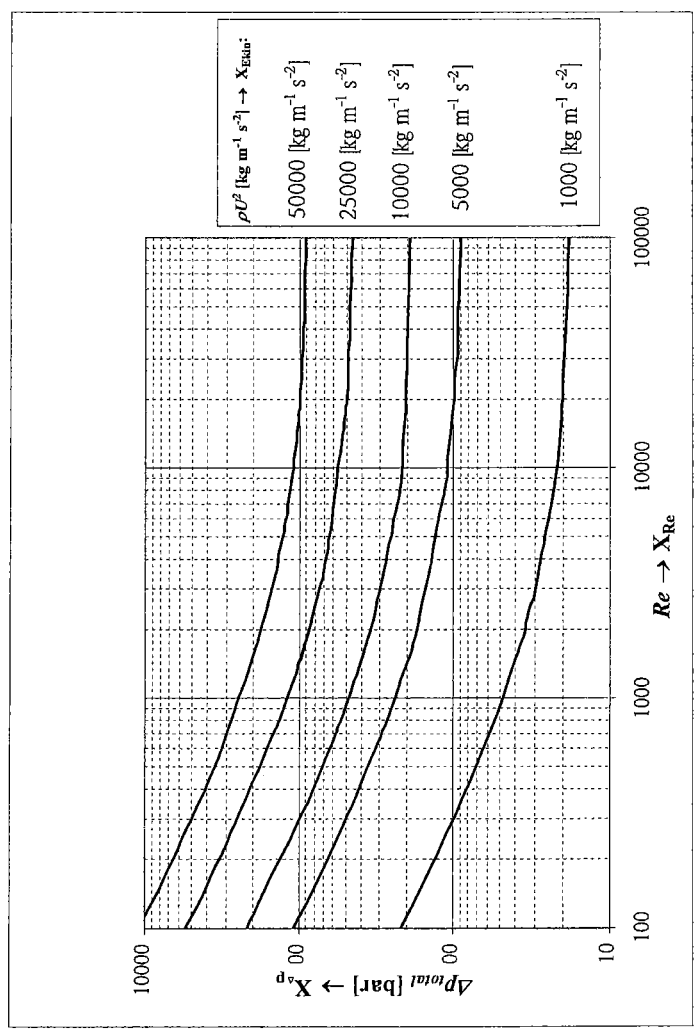
Figure 11:
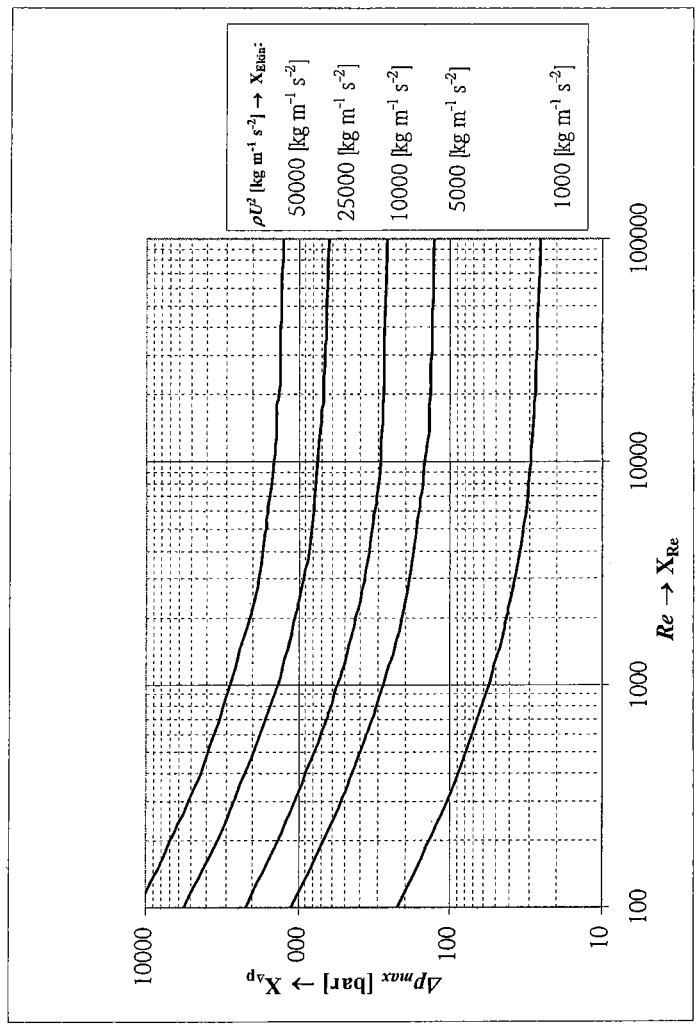
Figure 12:
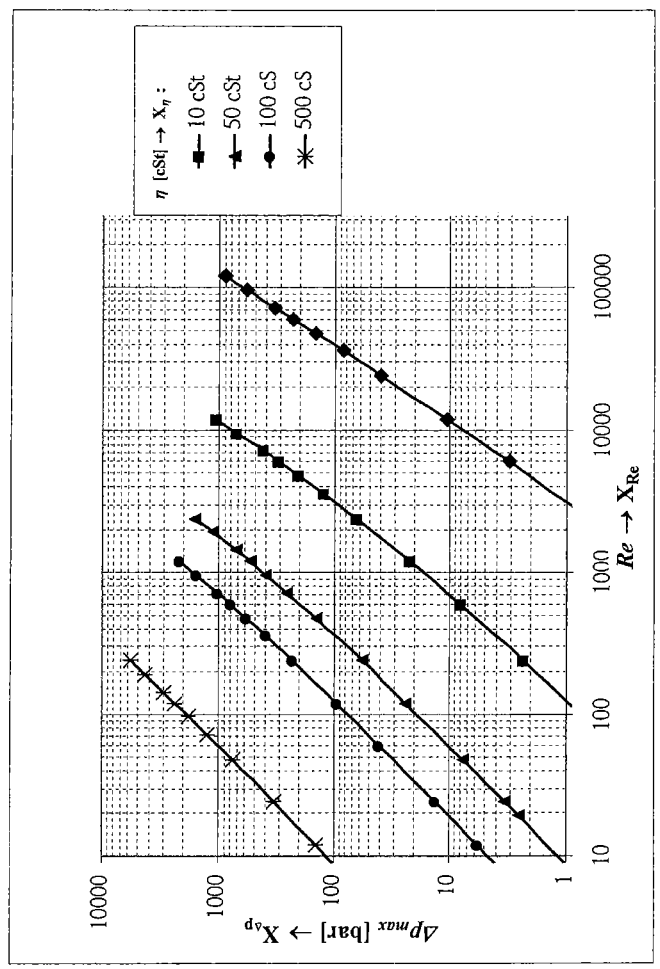
Figure 13:
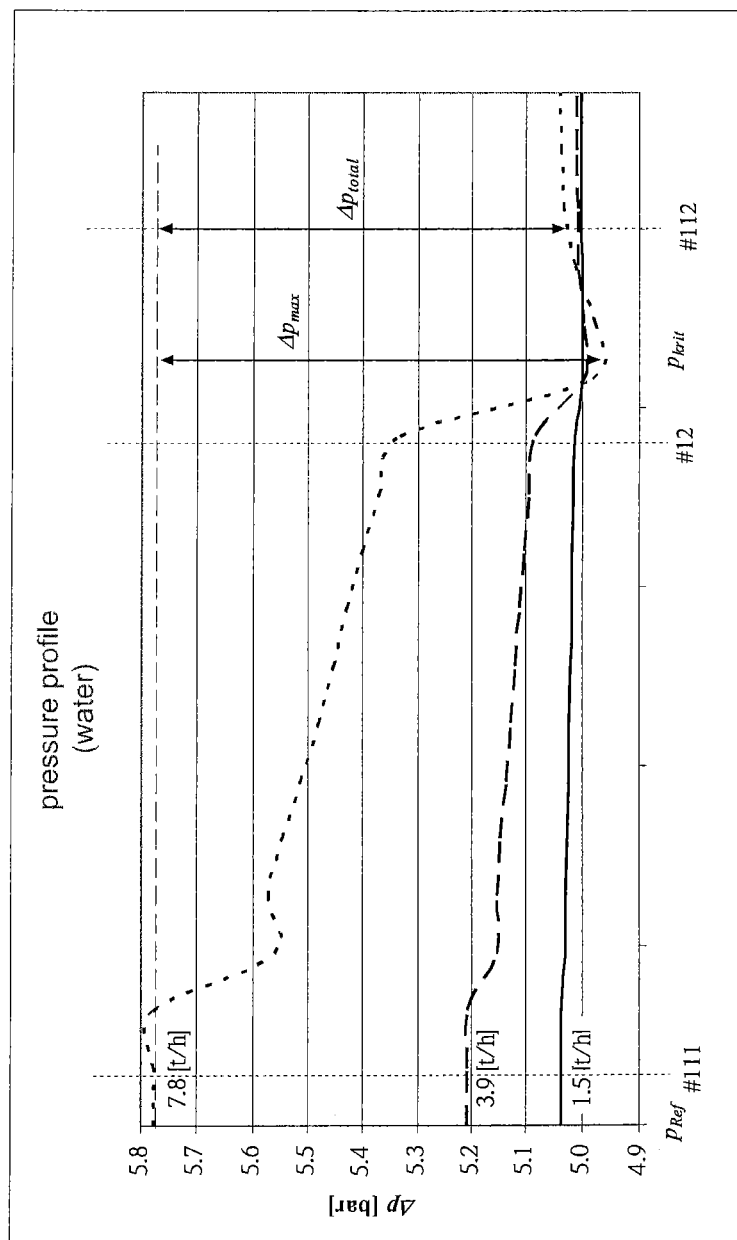
FIG. 13 shows experimentally ascertained pressure loss profiles in a conventional measuring transducer of vibration type, especially such obtained making use of computer-based simulation programs.

In an additional embodiment of the invention, the transmitter electronics ascertains the pressure difference measured value making use of the Reynolds number measured value $X_{Re}$ as well as a likewise measuring system-internally stored (for example, again, in the volatile data memory RAM), flow energy measured value $X_{Ekin}$, which represents a kinetic energy $\rho U^2$ of fluid flowing in the measuring transducer, which is dependent on a density $\rho$ and a flow velocity U of the fluid flowing in the measuring transducer. For such purpose, there is additionally implemented in the transmitter electronics a corresponding computing algorithm, which generates the pressure difference measured value based on the relationship (illustrated by way of example in FIG. 9) $X_{\Delta p}=(K_{\xi,1}+K_{\xi,2}\cdot X_{Re}^{K_{\xi,3}})\cdot X_{Ekin}$, wherein $K_{\xi,1}$, $K_{\xi,2}$, $K_{\xi,3}$, are measuring system parameters experimentally ascertained earlier (for instance, in the course of a calibrating of the measuring system and/or by means of computer-based calculations, e.g. by means of FEM, or CFD, and stored, especially as constants, in the transmitter electronics), which lastly also define the respective sites of the reference points underlying the pressure difference to be ascertained. The function formed by means of these measuring system parameters (an example of such a function ascertained by experimental investigations is shown in FIG. 10) virtually represents a pressure drop characteristic curve of the measuring system existing between the instantaneous, or currently valid, Reynolds number Re of the flowing fluid and a specific pressure drop dependent thereon, which is related to the instantaneous kinetic energy $\rho U^2$ of the fluid flowing in the measuring transducer. The function values $X_\xi = K_{\xi,1}+K_{\xi,2}\cdot X_{Re}^{K_{\xi,3}}$ generated internally in the transmitter electronics from the pressure drop characteristic curve, and referred to subsequently herein as the pressure drop coefficient depend only on the instantaneous Reynolds number. The measuring system parameters $K_{\xi,1}$, $K_{\xi,2}$, $K_{\xi,3}$ defining the pressure drop characteristic curve can, for example, be selected in such a manner that a first of the reference points is located in the inlet end #111 (here formed by the first housing end of the measuring transducer housing) of the measuring transducer, and that a second of the reference points is located in the outlet end #112 (here formed by the second housing end of the measuring transducer housing) of the measuring transducer, so that the pressure difference measured value $X_{\Delta p}$ thus, as a result, represents a total pressure difference, $\Delta p_{total}$, occurring in the flowing fluid from the inlet end to the outlet end; compare FIGS. 11, 12 and 13. The measuring system parameters and, in this respect, the reference points, can, however, also for example be selected in such a manner that the pressure difference measured value $X_{\Delta p}$, as is shown in FIG. 10, directly represents a maximal pressure drop $\Delta p_{max}$ in the fluid flowing within the measuring transducer. This maximum pressure drop $\Delta p_{max}$ occurs in the case of measuring transducers of the type being discussed, as is also evident from the pressure loss profiles for measuring transducers of the type being discussed (illustrated, by way of example, in FIG. 13) between the inlet end #111 of the measuring transducer formed by the first housing end and a region of increased turbulence located upstream from the outlet end #112 of the measuring transducer formed by the second housing end. For this case, in which, by a corresponding choice of the measuring system parameters for the pressure drop coefficient or the pressure drop-characteristic curve, one of the two reference points is placed at the (earlier precisely ascertained) site of minimum pressure ($\Delta p = \Delta p_{max}$) within the fluid flowing in the measuring transducer, the second pressure measured value $X_{p2}$ can thus be ascertained in such a manner that it represents the minimum static pressure within the fluid flowing in the measuring transducer, and thus, during operation of the measuring system, it can be directly detected whether, within the measuring transducer—or, in given cases, also directly downstream from the same outlet region of the connected pipeline—an impermissibly low static pressure in the flowing fluid is to be reckoned with.

Taking into consideration the pressure drop characteristic curve or the pressure drop coefficient $X_\xi$, the functional relationship proposed for ascertaining the pressure difference measured value, can, furthermore, be simplified to the relationship $X_{\Delta p} = X_\xi \cdot X_{Ekin}$.

According to an additional embodiment of the invention, for the purpose of ascertaining the second pressure measured value $X_{p2}$, especially also for ascertaining the pressure difference measured value $X_{\Delta p}$ needed therefor and/or the therefor required flow energy measured value $X_{Ekin}$ and/or the therefor required Reynolds number measured value $X_{Re}$, the measuring and evaluating circuit µC, making use of the oscillation signals $s_1$, $s_2$, delivered by the sensor arrangement 50—for example, on the basis of a phase difference detected between the oscillation signals $s_1$, $s_2$ of the first and second oscillation sensors 51, 52, generated in the case of measuring tube 10 oscillating partially in the wanted and Coriolis modes—additionally serves to recurringly ascertain a mass flow measured value X, which represents as precisely as possible the mass flow rate ṁ to be measured for the fluid guided through the measuring transducer. For such purpose, according to an additional embodiment of the invention, the measuring and evaluating circuit recurringly produces during operation a phase difference measured value $X_{\Delta \phi}$, which instantaneously represents the phase difference $\Delta \phi$ existing between the first primary signal $S_1$ and the second primary signal $s_2$. Making use of a frequency measured value $X_f$ likewise stored in the transmitter electronics and representing an oscillation frequency of vibrations, for example the above mentioned lateral bending oscillations, of the at least one measuring tube 10 in the wanted mode, the calculation of the mass flow measured value $X_m$ can occur, for example, based on the known relationship:

$$X_m = K_m \cdot \frac{X_{\Delta\varphi}}{X_f}$$

wherein $K_m$ is a measuring system parameter experimentally ascertained earlier (e.g. ascertained in the course of calibrating the measuring system and/or by means of computer-based calculations, and internally stored as a constant (e.g. in the non-volatile data memory) which correspondingly mediates between the quotient, formed here by means of the phase difference measured value $X_{\Delta\varphi}$ and the frequency measured value $X_f$, and the mass flow rate $\dot{m}$ to be measured. The frequency measured value $X_f$ can be ascertained in a simple manner, e.g. on the basis of the oscillation signals delivered by the sensor arrangement, or also on the basis of the at least one exciter signal feeding the exciter mechanism, in a manner known to those skilled in the art.

In an additional embodiment, it is further provided that the transmitter electronics stores, for example, in the volatile data memory RAM, a density measured value $X_\rho$, which instantaneously represents a density $\rho$ to be measured for the fluid, and/or a viscosity measured value $X_\eta$, which instantaneously represents a viscosity of the fluid. Based on the mass flow measured value $X_m$ and the density measured value $X_\rho$, by means of the transmitter electronics, the flow energy measured value $X_{Ekin}$ required for ascertaining the pressure difference measured value $X_{\Delta p}$ can be internally ascertained, for instance, by means of the relationship $$X_{Ekin} = K_{Ekin} \cdot \frac{(X_m)^2}{X_\rho},$$

while, making use of the mass flow measured value $X_m$, and the viscosity measured value $X_\eta$, the Reynolds number measured value $X_{Re}$ required for ascertaining the pressure difference measured value $X_{\Delta p}$ can be ascertained in a simple manner in the transmitter electronics, for instance, based on the relationship $$X_{Re} = K_{Re} \cdot \frac{X_m}{X_\eta}.$$

The corresponding measuring system parameters $K_{Ekin}$, and $K_{re}$, respectively, are essentially dependent on the effective flow cross section of the measuring transducer and can be directly experimentally ascertained beforehand, e.g., again, in the course of a calibrating of the measuring system and/or by means of computer-based calculations, and can be stored in the transmitter electronics as measuring system specific constants.

Taking into consideration the aforementioned functional relationships, the pressure difference measured value $X_{\Delta p}$ can also be ascertained based on one of the following relationships:

$$X_{\Delta p} = X_\zeta \cdot K_{Ekin} \cdot \frac{(X_m)^2}{X_\rho},$$

$$X_{\Delta p} = \left(K_{\zeta,1} + K_{\zeta,2} \cdot X_{Re}^{K_{\zeta,3}}\right) \cdot K_{Ekin} \cdot \frac{(X_m)^2}{X_\rho},$$

$$X_{\Delta p} = \left[K_{\zeta,1} + K_{\zeta,2} \cdot \left(K_{Re} \cdot \frac{X_m}{X_\eta}\right)^{K_{\zeta,3}}\right] \cdot X_{Ekin},$$

or $$X_{\Delta p} = \left[K_{\zeta,1} + K_{\zeta,2} \cdot \left(K_{Re} \cdot \frac{X_m}{X_\eta}\right)^{K_{\zeta,3}}\right] \cdot K_{Ekin} \cdot \frac{(X_m)^2}{X_\rho}.$$

The aforementioned defined flows with known Reynolds numbers, Re, known kinetic energy, $\rho U^2$, and known pressure curve, which are in each case required for the measuring system parameters $K_{\zeta,1}$, $K_{\zeta,2}$, $K_{\zeta,3}$ or $K_{Ekin}$ or $K_{Re}$ necessary for ascertaining the pressure difference measured value can be implemented with sufficient precision directly at corresponding calibration facilities, for example, by means of calibration fluids known as regards their flow characteristics, such as e.g. water, glycerin, etc., which are in each case conveyed as an impressed flow by means of correspondingly controlled pumps to the relevant measuring system to be calibrated. Alternatively thereto or in supplementation thereof, the flow parameters, such as the Reynolds number, the kinetic energy, the pressure difference, etc. required for ascertaining the measuring system parameters can, for example, also be ascertained metrologically by means of a pressure difference measuring system, which, together with the measuring system to be calibrated, forms one of the measuring systems proposed in the previously mentioned U.S. Pat. No. 7,406,878, and which, for the purpose of a wet calibration, is supplied with flows of correspondingly varied mass flow rates, densities and viscosities.

Making use of the pressure difference measured value $X_{\Delta p}$, it is also additionally possible to correct correspondingly the phase difference between the oscillation signals $s_1$, $s_2$ influenced to a certain degree also by the pressure conditions in the flowing fluid, or also to correct the likewise influenced oscillation frequency, for the purpose of increasing the accuracy of measurement of mass flow and/or density measured value during operation.

According to an additional embodiment of the invention, the measuring and evaluating circuit of the measuring system of the invention additionally serves to generate also the density measured value $X_\rho$, which is required for ascertaining the pressure difference measured value, and is derived, in manner known as such to those skilled in the art, from the oscillation frequency instantaneously represented by the frequency measured value $X_f$, based, for example, on the relationship:

$$X_\rho = K_{\rho,1} + \frac{K_{\rho,2}}{X_f^2},$$

wherein $K_{\rho,1}$, $K_{\rho,2}$, are measuring system parameters experimentally ascertained earlier and stored internally—for example, in the non-volatile data memory RAM—as constants correspondingly mediating between, on the one hand, the oscillation frequency represented by the frequency measured value $X_f$, and, on the other hand, the density $\rho$ to be measured.

Alternatively thereto or in supplementation thereof, the evaluating circuit, as is quite usual in the case of in-line measuring devices of the type being discussed, can, in given cases, also be used to ascertain the viscosity measured value $X_\eta$ required for ascertaining the pressure difference measured value; compare to this also the previously mentioned U.S. Pat. Nos. 7,284,449, 7,017,424, 6,910,366, 6,840,109, 5,576,500 or 6,651,513. For ascertaining the exciter energy or excitation power or damping required for determining the viscosity, the exciter signal delivered from the driver circuit of the transmitter electronics is, for example, in such case suitable, especially an amplitude and frequency of its electrical current component driving the wanted mode, or also an amplitude of the total exciter current, in given cases also normalized to an oscillation amplitude ascertained on the basis of at least one of the oscillation signals. Alternatively thereto or in supplementation thereof, however, also an internal control signal serving for adjusting the exciter signal or the exciter current, or, for example, in the case of exciting vibrations of the at least one measuring tube with an exciter current of a fixedly predetermined amplitude or one controlled to be constant, also at least one of the oscillation signals, and especially an amplitude thereof, can serve as a measure of the exciter energy or excitation power or damping required for ascertaining the viscosity measured value.

The aforementioned calculational functions—especially also those in each case serving for producing the pressure difference measured value $X_{\Delta p}$ or other such functions of the aforementioned measured values—can be implemented very simply, e.g. by means of the above mentioned microcomputer of the evaluating circuit μC, or, for example, also by means of a digital signal processor DSP correspondingly provided therein. The creation and implementation of corresponding algorithms which correspond to the above-described formulas or, for example, also reproduce the operation of the mentioned amplitude or frequency control circuit for the exciter mechanism, as well as its translation into program code correspondingly executable in the transmitter electronics, is known, as such, to those skilled in the art, and consequently needs—in any event, in the context of the present invention—no detailed explanation. Of course, the aforementioned formulas or other functionalities of the measuring system implemented with the transmitter electronics can also directly, wholly or partially be implemented in the transmitter electronics TE by means of corresponding discretely constructed and/or hybrid (thus mixed analog-digital). calculational circuits.

The invention claimed is:

1. A measuring system for flowing fluids, said measuring system comprising:
   a measuring transducer of the vibration type, through which, during operation, a fluid flows, and which produces oscillation signals corresponding to parameters; and
   a transmitter electronics electrically coupled with said measuring transducer for activating said measuring transducer and for evaluating oscillation signals delivered by said measuring transducer,
   said measuring transducer including:
   at least one measuring tube for conveying flowing fluid,
   at least one electro-mechanical oscillation exciter for actively exciting and/or maintaining vibrations of the at least one measuring tube in a wanted mode, and at least a first oscillation sensor for registering vibrations at least of the at least one measuring tube, and for producing a first primary signal of the measuring transducer representing vibrations at least of the at least one measuring tube; wherein:
   the transmitter electronics is adapted to generate, using a first signal component of the oscillation signal produced by said at least one oscillation sensor and representing a bending oscillation mode, in which the at least one vibrating measuring tube executes bending oscillations exhibiting at least one oscillatory antinode more than in the case of the bending oscillations in the wanted mode and using a second signal component of the oscillation signal representing a bending oscillation mode, in which said at least one vibrating measuring tube executes bending oscillations with at least one oscillatory antinode more than in the case of the oscillation mode represented by the first signal component, a cavitation report signaling an occurrence of cavitation in the fluid.

2. The measuring system as claimed in claim 1, wherein: said transmitter electronics delivers at least one exciter signal for said at least one oscillation exciter effecting bending oscillations of said at least one measuring tube.

3. The measuring system as claimed in claim 2, wherein: the exciter signal, at least a wanted signal component of said exciter signal which dominates as regards a signal power and/or a signal voltage and which produces bending oscillations of said measuring tube as a signal frequency which corresponds to an instantaneous resonance frequency of bending oscillations of said measuring tube.

4. The measuring system as claimed in claim 3, wherein: the signal frequency of the exciter signal or the wanted signal component of the exciter signal corresponds to an instantaneous resonance frequency of a bending oscillation mode of first order, in which said at least one vibrating measuring tube executes over a wanted oscillation length bending oscillations with exactly one oscillatory antinode; and wherein the first signal component of the oscillation signal has a signal frequency which is greater than the signal frequency of the exciter signal corresponding to the instantaneous resonance frequency of the bending oscillation mode of first order.

5. The measuring system as claimed in claim 2, wherein: by means of the exciter signal and by means of the oscillation signal, said transmitter electronics generates a pressure difference measured value, which represents a pressure difference occurring between two predetermined reference points in the flowing fluid.

6. Measuring system as claimed in claim 5, wherein: the transmitter electronics generates the cavitation report making use of the pressure difference measured value.

7. Measuring system as claimed in claim 5, wherein: making use of the pressure difference measured value, said transmitter electronics generates an alarm, which signals an exceeding of an earlier defined maximum allowable sinking of a static pressure in the fluid flowing through the measuring transducer; and/or making use of the pressure difference measured value, said transmitter electronics generates an alarm, which signals a too-high pressure drop in the fluid, which is provoked by said measuring transducer.

8. Measuring system as claimed in claim 5, wherein: the transmitter electronics ascertains the pressure difference measured value making use of a Reynolds number measured value, which represents a Reynolds number, Re, for fluid flowing in said measuring transducer.

9. Measuring system as claimed in claim 5, wherein: said transmitter electronics ascertains the pressure difference measured value making use of a viscosity measured value, which represents a viscosity, η, of fluid flowing in said measuring transducer.

10. Measuring system as claimed in claim 5, wherein: for ascertaining the pressure difference measured value, said transmitter electronics generates a pressure drop coefficient, which represents a pressure drop across said measuring transducer dependent on the instantaneous Reynolds number, Re, of the flowing fluid referenced to an instantaneous kinetic energy of the fluid flowing in said measuring transducer.

11. The measuring system as claimed in claim 1, wherein: the first signal component of the oscillation signal exhibits a signal frequency which corresponds to an instantaneous resonance frequency of a natural bending oscillation mode inherent to said measuring tube, in which said measuring tube executes bending oscillations with exactly one oscillatory antinode more than in the case of the bending oscillations in the wanted mode.

12. The measuring system as claimed in claim 1, wherein: the transmitter electronics generates the cavitation report only when a magnitude of a signal voltage of the first signal component of the oscillation signal exceeds a threshold value predetermined therefor.

13. The measuring system as claimed in claim 1, wherein: the second signal component of the oscillation signal represents a bending oscillation mode, in which said at least one vibrating measuring tube executes bending oscillations with at least three oscillation antinodes.

14. The measuring system as claimed in claim 1, wherein: the second signal component of the oscillation signal exhibits a signal frequency corresponding to an instantaneous resonance frequency of that bending oscillation mode of third order, in which said at least one vibrating measuring tube executes bending oscillations with exactly two oscillation antinodes more than in the case of the bending oscillations in the wanted mode.

15. The measuring system as claimed in claim 1, wherein: said transmitter electronics generates the cavitation report only when a magnitude of a signal voltage of the second signal component of the oscillation signal does not exceed a threshold value predetermined therefor.

16. The measuring system as claimed in claim 15, wherein: the threshold value for the magnitude of the signal voltage of the first signal component of the oscillation signal is selected in such a manner that it is greater than a magnitude of the signal voltage of the second signal component of the oscillation signal; and/or
the threshold value for the magnitude of the signal voltage of the first signal component of the oscillation signal and the threshold value for the magnitude of the signal voltage of the second signal component of the oscillation signal are selected in such a manner that a threshold value ratio, defined by a ratio of the threshold value for the magnitude of the signal voltage of the first signal component of the oscillation signal to the threshold value for the magnitude of the signal voltage of the second signal component of the oscillation signal, is greater than one.

17. The measuring system as claimed in claim 15, wherein: the threshold value is changeable during operation and/or dependent on an instantaneous signal voltage of the first signal component of the oscillation signal.

18. The measuring system as claimed in claim 1, wherein: said transmitter electronics only generates the cavitation report when a signal-voltage ratio, defined by a ratio of the magnitude of the signal voltage of the first signal component of the oscillation signal to the magnitude of the signal voltage of the second signal component of the oscillation signal exceeds a threshold value predetermined for said signal-voltage ratio.

19. The measuring system as claimed in claim 18, wherein: the threshold value for the signal-voltage ratio is selected so as to be greater than one.

20. The measuring system as claimed in claim 18, wherein: the threshold value is changeable during operation and/or dependent on an instantaneous signal voltage of the of first signal component of the oscillation signal and/or dependent on an instantaneous signal voltage of the second signal component of the oscillation signal.

21. The measuring system as claimed in claim 18, wherein: the threshold value for the signal-voltage ratio is selected so as to be greater than two.

22. The measuring system as claimed in claim 1, wherein: said transmitter electronics generates the cavitation report also making use of a pressure measured value, which represents a pressure, $p_{Ref}$, reigning in the flowing fluid.

23. The measuring system as claimed in claim 1, further comprising: a pressure sensor, which communicates during operation with said transmitter electronics, and which serves for registering a pressure reigning upstream from an inlet end of said measuring transducer or downstream from an outlet end of said measuring transducer in a pipeline conveying the fluid.

24. A measuring system for flowing fluids, said measuring system comprising:
a measuring transducer of the vibration type, through which, during operation, a fluid flows, and which produces oscillation signals corresponding to parameters;
a pressure sensor for registering a pressure reigning in a pipeline conveying the fluid; and
a transmitter electronics electrically coupled with said measuring transducer for activating said measuring transducer and for evaluating oscillation signals delivered by said measuring transducer;
said measuring transducer including:
at least one measuring tube for conveying flowing fluid,
at least one electro-mechanical oscillation exciter for actively exciting and/or maintaining vibrations of the at least one measuring tube in a wanted mode, and
at least a first oscillation sensor for registering vibrations at least of the at least one measuring tube, and for producing a first primary signal of the measuring transducer representing vibrations at least of the at least one measuring tube; wherein:
the pressure sensor communicates during operation with said transmitter electronics, and
the transmitter electronics is adapted to generate, using a signal component of the oscillation signal produced by said at least one oscillation sensor and representing a bending oscillation mode, in which the at least one vibrating measuring tube executes bending oscillations exhibiting at least one oscillatory antinode more than in the case of the bending oscillations in the wanted mode and a pressure measured value being measured by means of said pressure sensor and representing a pressure reigning in the flowing fluid, a cavitation report signaling an occurrence of cavitation in the fluid.

* * * * *